(12) United States Patent
Christian et al.

(10) Patent No.: US 10,198,532 B2
(45) Date of Patent: Feb. 5, 2019

(54) REDUCING DATA STORAGE, MEMORY, AND COMPUTATIONAL TIME NEEDED FOR AD-HOC DATA ANALYSIS

(71) Applicant: SAS Institute Inc., Cary, NC (US)

(72) Inventors: Stacey Michelle Christian, Pittsboro, NC (US); Katherine Fullington Taylor, Raleigh, NC (US); Donald James Erdman, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/922,317

(22) Filed: Mar. 15, 2018

(65) Prior Publication Data
US 2018/0268080 A1    Sep. 20, 2018

Related U.S. Application Data

(60) Provisional application No. 62/471,533, filed on Mar. 15, 2017.

(51) Int. Cl.
*G06F 17/30* (2006.01)
*G06F 17/18* (2006.01)

(52) U.S. Cl.
CPC ........ *G06F 17/30979* (2013.01); *G06F 17/18* (2013.01); *G06F 17/30091* (2013.01); *G06F 17/30138* (2013.01)

(58) Field of Classification Search
None
See application file for complete search history.

(56) References Cited

U.S. PATENT DOCUMENTS

| | | | |
|---|---|---|---|
| 2002/0029207 A1* | 3/2002 | Bakalash | G06F 17/30457 |
| 2008/0133478 A1* | 6/2008 | Weiler | G06Q 10/10 |
| 2012/0310986 A1* | 12/2012 | Frantz | G06F 17/30306 |
| | | | 707/792 |
| 2013/0166566 A1* | 6/2013 | Lemke | G06F 17/30315 |
| | | | 707/741 |

OTHER PUBLICATIONS

Activeviam "ActivePivot: Under the hood" White Paper, retrieved from www.activeviam.com (2016) 11 pages.
(Continued)

*Primary Examiner* — Alex Gofman
(74) *Attorney, Agent, or Firm* — Kilpatrick Townsend & Stockton LLP

(57) ABSTRACT

A compressed data structure is disclosed for storing collected data and delivering ad-hoc data analysis. The compressed data structure can reduce hardware requirements, such as data storage requirements, and decrease processing requirements during ad-hoc data analysis. Raw data can be pre-aggregated to a base level of aggregation (base cell level) that is determined by the unique combination of attributes available for aggregation. Rather than storing the raw data, the entire distribution is stored at the base cell level along with a selection of pre-computed statistics of the raw data. At the time of ad-hoc analysis, pre-computed results based on the raw data can be retrieved or computed from the pre-computed statistics, or analysis of higher-level data can be computed on-demand based on the pre-aggregated base level data.

27 Claims, 19 Drawing Sheets

(56) References Cited

OTHER PUBLICATIONS

Activeviam "In-memory analytical platform" (2016) 2 pages.
Murex "Enterprise Risk Management" retrieved from www.murex.com/solutions/business-functions/enterprise-risk-management (Mar. 15, 2017) 4 pages.
IBM "Algo Risk" retrieved from www.03.ibm.com/software/products/en/algorisk (Mar. 15, 2017) 2 pages.
IBM "Algo Risk Service on Cloud with market data" retrieved from www.risk.net/asset-management/2445252/ibm-algo-risk-service-on-cloud-with-market-data (Mar. 15, 12017) 1 page.

\* cited by examiner

REDUCING DATA STORAGE, MEMORY, AND COMPUTATIONAL TIME NEEDED FOR AD-HOC DATA ANALYSIS

CROSS REFERENCE TO RELATED APPLICATIONS

The present application claims the benefit of U.S. Provisional Patent Application No. 62/471,533 filed Mar. 15, 2017 and entitled "REDUCING DATA STORAGE, MEMORY, AND COMPUTATIONAL TIME NEEDED FOR AD-HOC DATA ANALYSIS," which is hereby incorporated by reference in its entirety.

TECHNICAL FIELD

The present disclosure relates to computing generally and more specifically to efficient data structures.

BACKGROUND

Ad-hoc analysis involves the determination of analytical results, or statistics or metrics, based on granular data. Data is accessed at the lowest level of granularity and an analytics engine aggregates data on-the-fly to generate a result for the ad-hoc analysis being performed. Many applications of this involve extremely large amounts of data and on-demand ad-hoc analysis can have substantial hardware requirements, such as large storage systems (e.g., large number of terabytes of storage, or more, for storing raw data), vast memory (e.g., random access memory for use during analysis), and vast computing power (e.g., numerous computation cycles or threads, or numerous computing nodes, for aggregating data during analysis).

Due to the demand and usefulness of fast, on-demand ad-hoc analysis, enterprises must expend substantial amounts of resources to obtain and maintain large storage systems, vast memory, and vast computing power for the purposes of ad-hoc analysis.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a system, comprising: one or more data processors; and a non-transitory computer-readable storage medium containing instructions which, when executed on the one or more data processors, cause the one or more data processors to perform operations including: receiving a query for a property of collected data, wherein the collected data is associated with multiple observations for a plurality of records, and wherein the collected data would occupy a first amount of storage space when stored; accessing a compressed data structure associated with the set of collected data, wherein the compressed data structure includes an aggregated dataset and a calculated dataset, wherein the aggregated dataset contains aggregated observations for the plurality of records having common values for one or more selected dimension variables, wherein the calculated dataset contains pre-calculated metrics derived from the multiple observations for each of the plurality of records, and wherein the compressed data structure occupies a second amount of storage space that is less than the first amount of storage space; generating a response to the query using the compressed data structure; and transmitting the response to the query.

Embodiments of the present disclosure include a computer-implemented method, comprising: receiving a query for a property of collected data, wherein the collected data is associated with multiple observations for a plurality of records, and wherein the collected data would occupy a first amount of storage space when stored; accessing a compressed data structure associated with the set of collected data, wherein the compressed data structure includes an aggregated dataset and a calculated dataset, wherein the aggregated dataset contains aggregated observations for the plurality of records having common values for one or more selected dimension variables, wherein the calculated dataset contains pre-calculated metrics derived from the multiple observations for each of the plurality of records, and wherein the compressed data structure occupies a second amount of storage space that is less than the first amount of storage space; generating a response to the query using the compressed data structure; and transmitting the response to the query.

Embodiments of the present disclosure include a computer-program product tangibly embodied in a non-transitory machine-readable storage medium, including instructions configured to cause a data processing apparatus to perform operations including: receiving a query for a property of collected data, wherein the collected data is associated with multiple observations for a plurality of records, and wherein the collected data would occupy a first amount of storage space when stored; accessing a compressed data structure associated with the set of collected data, wherein the compressed data structure includes an aggregated dataset and a calculated dataset, wherein the aggregated dataset contains aggregated observations for the plurality of records having common values for one or more selected dimension variables, wherein the calculated dataset contains pre-calculated metrics derived from the multiple observations for each of the plurality of records, and wherein the compressed data structure occupies a second amount of storage space that is less than the first amount of storage space; generating a response to the query using the compressed data structure; and transmitting the response to the query.

In some cases, generating the response includes accessing at least one of the aggregated dataset and the calculated dataset, and wherein the property is retrievable or computable from the compressed data structure. In some cases, generating the response includes accessing the pre-calculated metrics from the calculated dataset when the property is retrievable from the pre-calculated metrics. In some cases, generating the response includes accessing the aggregated dataset when the property is retrievable or computable from the aggregated observations. In some cases, the number of pre-calculated metrics for each of the plurality of records in the compressed data structure is fewer than a number of observations associated with each of the plurality of records of the collected data. In some cases, the compressed data structure further includes retained data, wherein the retained data includes a selected subset of data from the collected data that is less than all of the collected data, and wherein generating the response to the query includes accessing the retained data. In some cases, the selected subset of data is associated with a particular quantile of the collected data. In some cases, the selected subset of data is usable to recreate a distribution associated with the collected data. In some cases, the compressed data structure further includes distribution data, wherein the distribution data includes a plurality of data points is usable to recreate a distribution associated with the collected data. In some cases, generating the response includes accessing both of the aggregated dataset and the calculated dataset, and wherein the property is computable from the compressed data structure.

Embodiments of the present disclosure include a system, comprising: one or more data processors; and a non-transitory computer-readable storage medium containing instructions which, when executed on the one or more data processors, cause the one or more data processors to perform operations including: receiving collected data, wherein the collected data is associated with multiple observations for a plurality of records, and wherein the collected data occupies a first amount of storage space; selecting one or more dimension variables associated with the collected data; generating an aggregated dataset using the collected data and the selected one or more dimension variables, wherein generating the aggregated dataset includes aggregating observations for the plurality of records having common values for the one or more dimension variables; accessing a plurality of selected metrics; generating a calculated dataset using the collected data, wherein generating the calculated dataset includes computing the plurality of selected metrics for the plurality of records; and storing a compressed data structure including the aggregated dataset and the calculated dataset, wherein the compressed data structure occupies a second amount of storage space, and wherein the second amount of storage space is less than the first amount of storage space.

Embodiments of the present disclosure include a computer-implemented method, comprising: receiving collected data, wherein the collected data is associated with multiple observations for a plurality of records, and wherein the collected data occupies a first amount of storage space; selecting one or more dimension variables associated with the collected data generating an aggregated dataset using the collected data and the selected one or more dimension variables, wherein generating the aggregated dataset includes aggregating observations for the plurality of records having common values for the one or more dimension variables; accessing a plurality of selected metrics; generating a calculated dataset using the collected data, wherein generating the calculated dataset includes computing the plurality of selected metrics for the plurality of records; and storing a compressed data structure including the aggregated dataset and the calculated dataset, wherein the compressed data structure occupies a second amount of storage space, and wherein the second amount of storage space is less than the first amount of storage space.

Embodiments of the present disclosure include a computer-program product tangibly embodied in a non-transitory machine-readable storage medium, including instructions configured to cause a data processing apparatus to perform operations including: receiving collected data, wherein the collected data is associated with multiple observations for a plurality of records, and wherein the collected data occupies a first amount of storage space; selecting one or more dimension variables associated with the collected data generating an aggregated dataset using the collected data and the selected one or more dimension variables, wherein generating the aggregated dataset includes aggregating observations for the plurality of records having common values for the one or more dimension variables; accessing a plurality of selected metrics; generating a calculated dataset using the collected data, wherein generating the calculated dataset includes computing the plurality of selected metrics for the plurality of records; and storing a compressed data structure including the aggregated dataset and the calculated dataset, wherein the compressed data structure occupies a second amount of storage space, and wherein the second amount of storage space is less than the first amount of storage space.

In some cases, the method or operations further comprise discarding the collected data after storing the compressed data structure. In some cases, the method or operations further comprise: receiving a query associated with the collected data; and generating a response to the query, wherein generating the response comprises accessing at least one of the aggregated dataset and the calculated dataset. In some cases, the method or operations further comprise determining to compress the collected data, wherein determining to compress the collected data comprises estimating a reduction in storage space. In some cases, estimating a reduction in storage space comprises: determining a number of observations associated with the plurality of records of the collected data; determining a number of metrics in the plurality of selected metrics; and comparing the number of observations with the number of metrics. In some cases, selecting the one or more dimension variables comprises selecting the one or more dimension variables such that at least two of the plurality of records share common values for the one or more dimension variables. In some cases, the method or operations further comprise: selecting a subset of data from the collected data to retain, wherein the subset of data is less than all of the collected data; storing the subset of data as retained data; and wherein storing the compressed data structure further includes storing the retained data. In some cases, selecting the subset of data comprises selecting data associated with a particular quantile of the collected data. In some cases, selecting the subset of data comprises selecting data usable to recreate a distribution associated with the collected data. In some cases, the method or operations further comprise: computing a distribution associated with the collected data; storing a plurality of data points associated with the distribution, wherein the plurality of data points is usable to recreate the distribution without the collected data; storing the plurality of data points as retained data; and wherein storing the compressed data structure further includes storing the retained data.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
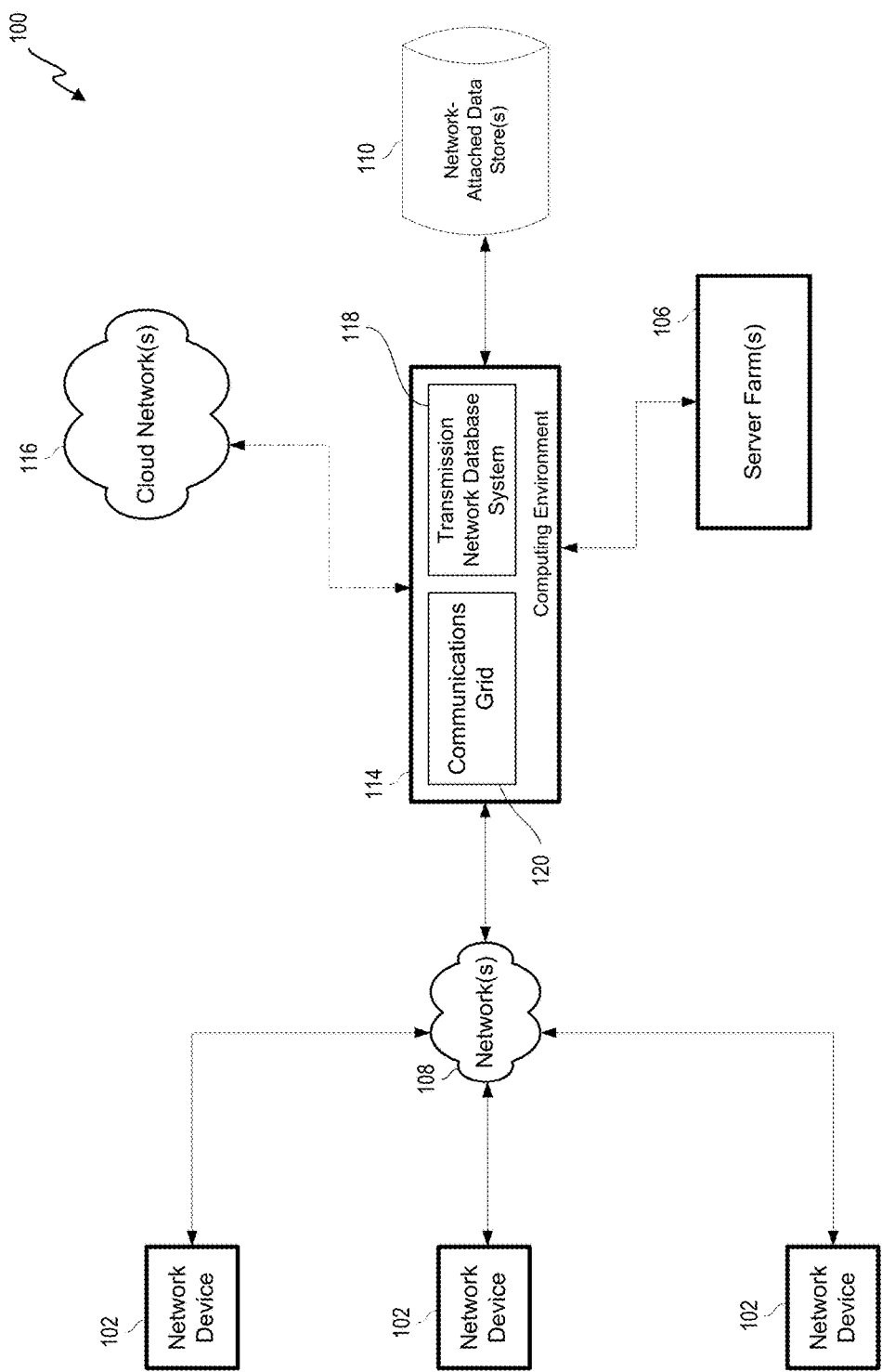
FIG. 1 illustrates a block diagram that provides an illustration of the hardware components of a computing system, according to some embodiments of the present technology.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Certain aspects and features of the present disclosure relate to reducing hardware requirements, such as data storage requirements, for ad-hoc data analysis. Raw data can be pre-aggregated to a base level of aggregation (base cell level) that is determined by the unique combination of attributes available for aggregation. Rather than storing the raw data, the data is stored at the base cell level along with a selection of pre-computed metrics of the raw data. At the time of ad-hoc analysis, results based on the raw data can be retrieved or computed from the pre-computed metrics or analysis of higher-level data can computed on-demand based on the pre-aggregated base cell level data.

To permit on-demand ad-hoc analysis, enterprises expend substantial amounts of money and resources to obtain and maintain large storage systems, vast memory, and vast computing power for the purposes of ad-hoc analysis. However, certain aspects and features of the present disclosure enable enterprises to support ad-hoc analysis with less hardware or to improve the functionality of existing hardware by decreasing the amount of storage space occupied, decreasing the amount of memory necessary for ad-hoc analysis, and decreasing the amount of computing power necessary for ad-hoc analysis. Certain aspects and features of the present disclosure relate to a data structure designed for optimizing ad-hoc analysis by storing pre-aggregated data and pre-calculated metrics (e.g., pre-calculated statistics) based on a full raw dataset, rather than storing the full raw dataset itself. The pre-aggregated data and pre-calculated metrics can achieve high levels of compression over the original raw dataset (e.g., at least approximately 90-95% compression), depending on the number of records, the number of items in the base cell level, and number of pre-computed metrics.

The vast majority of ad-hoc analysis can be performed by solely leveraging the pre-calculated metrics and/or the pre-aggregated data, as described herein. Thus, in some cases, the original raw dataset can be deleted or otherwise lost without concern. However, in some cases, it may be desirable to maintain a copy of the original raw dataset, such as for future, more detailed analysis, for compliance purposes, or for other reasons. In such cases, the original raw dataset can be moved to a cold storage system capable of storing the dataset with relatively less expensive than keeping the data in a live system capable of performing ad-hoc analysis.

In an example, a utility company may receive data representing daily water usage for every household across several neighborhoods and cities. This collection of daily water usage data for each household serviced by the utility company can represent the original raw dataset. Under current practice, such a utility company may have stored the entire dataset and performed calculations on every record to generate an ad-hoc analysis. Such practice would have consumed substantial storage space and substantial computing resources (e.g., processing time and power). However, rather than storing this entire dataset and/or performing ad-hoc analysis on this full dataset whenever analysis is desired, certain aspects of the present disclosure can be used to generate a pre-calculated set of statistics (e.g., pre-calculated metrics) and a pre-aggregated dataset. In this example, the daily records for every household can be pre-aggregated in a meaningful way, such as by neighborhood. For example, a neighborhood with 80 houses may be aggregated together, thus reducing the amount of stored data for that neighborhood drastically (e.g., from 80 rows of a table to 1 row of a table). In addition to pre-aggregating the data, certain pre-calculated metrics can be generated for each household, such as average water usage, maximum water usage, standard deviation, and other such pre-calculated metrics. The pre-calculated metrics can be stored by household, without aggregation, however significant data compression can be achieved by storing only pre-calculated metrics per household, rather than storing each day's water usage per household. In the compressed data structure, the total number of records may be significantly reduced. For example, when stored as a tables, a first table with daily water usage may be pre-aggregated by neighborhood, thus significantly reducing the total number of rows in the table (e.g., from millions of households to several thousand neighborhoods). A second table with water usage data for each individual household may include only pre-calculated metrics instead of daily water usage, thus significantly reducing the total number of columns in the table (e.g., from thousands of days of water data to tens of columns of pre-calculated metrics). In an example, certain aspects of the present disclosure was used to take an original raw dataset that included approximately 6 gigabytes of water usage data for 1,000,000 customers over 6,000 days and compress it into data structure compressed and/or optimized for ad-hoc analysis occupying 0.25 gigabytes, for a savings of 95% disk space and memory. The compressed data structure is capable of performing nearly all of the same ad-hoc analysis of the original data set, with only minor limitations (e.g., filtering is limited to the selected attribute, such as neighborhood, rather than individual records; and new metrics that were not pre-calculated for individual records cannot be calculated).

Certain aspects and features of the present disclosure are especially beneficial when the number of observations in a dataset exceeds the number of aggregations. In the above example, if the dataset only included three households across a total of three neighborhoods, the amount of data required to store the three households' daily water usage may be approximately the same as that that required to store the three neighborhoods' daily water usage. Thus, in some cases, a determination can be made whether to use a raw dataset or a compressed data structure based on the number of observations and number of aggregations. In some cases, if the number of records exceeds or is anticipated to exceed the number of aggregations for the pre-aggregated data, the compressed data structure can be used.

Certain aspects and features of the present disclosure are especially beneficial when the number of observations in a dataset exceeds the number of pre-computed metrics that may be desired for the dataset. In the above example, if the dataset only included two days' worth of water usage, the amount of data required to store the two days' worth of water usage for each individual household may be less than that required to store each of the pre-calculated metrics (e.g., averages, deviations, quantiles, etc.) for each individual household. Thus, in some cases, a determination can be made whether to use a raw dataset or a compressed data structure based on the number of observations and number of pre-computed metrics. In some cases, if the number of observations exceeds or is anticipated to exceed the number of pre-computed metrics, the compressed data structure can be used.

In some cases, the determination with respect to whether or not to use the compressed data structure can take into account whether the number of records exceeds or is anticipated to exceed the number of aggregations for the pre-aggregated data and whether the number of observations exceeds or is anticipated to exceed the number of pre-computed metrics.

The aggregated data can be aggregated according to any suitable dimension variable or set of dimension variables. The dimension variables can be user-selected or automatically determined. In some cases, a user can pre-set the dimension variables to use, such as according to that user's needs. In some cases, the user can be presented with an option to choose different dimension variables, which can be accompanied by an estimated savings in storage space accomplished by aggregating based on the different available dimension variables. For example, in the case of the utility company, a user may be presented with options to aggregate by neighborhood, city quadrant, city, or state. It can be expected that aggregating by state may result in smaller storage than aggregating by neighborhood, but would also lose the ability to access certain neighborhood-specific data. In some cases, the dimension variable can be automatically determined, such as to meet or exceed a particular storage requirement (e.g., occupy a final storage size of no more than 0.5 gigabytes) or to meet or exceed a particular speed requirement (e.g., a processing time requirement).

In some cases, the compressed data structure can further include supplemental data. Supplemental data can include additional data other than the pre-aggregated data and the pre-calculated metrics. Examples of supplemental data can include retained data and generated distribution data.

In some cases, the compressed data structure can further include a subset of retained data. The retained data can include a portion of the original raw data that is retained within the compressed data structure. The retained data can be selected to include certain data that is deemed important enough to be stored in its original form, such as data that may be expected to be subjected to closer analysis at a later time. In the above example, it may be desirable to retain the daily water usage for those days that exceed a particular quantile for each household. Thus, instead of storing every days' worth of water usage for each household, the compressed data structure would only store the pre-aggregated data, the pre-calculated metrics, and the water usage for only those days where the water usage exceeded the particular quantile (e.g., 75th quantile). It can be desirable to store certain quantiles, such as the higher or lower quantiles, depending on what data may be especially useful for a particular purpose. In the example of a water utility, storing data for higher quantile usage can represent storing data for larger water usage, which may allow the water utility to provide improved service or diagnose issues associated with larger water usage. In some cases, it can be desirable to store only a lower quantile or portion of the data. In some cases, it can be desirable to store both lower and higher quantiles or portions of the data. This retained data can be stored on its own or along with the pre-calculated metrics, such as in the same table as the pre-calculated metrics. The determination of what data to be retained can be made dynamically based on the raw data, such as using statistical analysis.

In some cases, retained data can include data for certain selected dimension variables that are hierarchically at a lower (e.g., more granular) level than the dimension variable used to aggregate the collected data. For example, the utility company may wish to aggregate collected data based on neighborhoods, but may choose to keep as retained data the collected data for a particular home. As an example, the utility company may wish to aggregate collected data for a neighborhood that contains an official residence of a state governor, but also keep the collected data for that official residence as retained data. In some cases, this type of retained data can be automatically selected for retention based on whether the data from the lower-level dimension variable is a statistical outlier from the dimension variable used to aggregate the collected data. For example, if a particular house in a neighborhood always uses much more water than any other house in the neighborhood, the collected data for that particular house can be automatically stored as retained data in addition to the aggregated data for that neighborhood.

In some cases, the compressed data structure can further include distribution data. Distribution data can include one or more data points representative of a distribution of the original data. The distribution data can be select points of raw data that have been retained as retained data (e.g., retained distribution data) or can be values that have been calculated based on the raw data to generate an accurate distribution (e.g., generated distribution data). Distribution data can include sufficient data points to generate a distribution that approximates the distribution of the original data. In the above example, instead of storing every day's worth of water usage to generate a visual representation of the distribution of water usage for the household, distribution data can be stored for the household. When plotted, the distribution data can generate a distribution graph that approximates the distribution of the original data. Any suitable distribution data can be stored, such as binned values to recreate a histogram or values to recreate a fit line of a distribution. The number of points stored for the distribution data can be set manually (e.g., by a user) or can be dynamically determined based on the original dataset, such as based on the complexity of the original data's distribution and/or the size of the original dataset.

Aspects of the present disclosure can be performed on distributed systems. In some cases, multiple nodes can each receive a subset of the collected data. The data subset can represent a number of rows of observations. The node can generate initial aggregated data based on this data subset, aggregating the rows of observations based on the selected dimension variables. The node can also compute pre-calculated metrics based on its data subset. The node can then transmit its initial aggregated data and/or receive additional aggregated data from another node. The node can use the additional aggregated data from the other node, as well as further aggregated data from any number of nodes, in combination with its own initial aggregated data, to generate a complete set of aggregated data. In some cases, the node can determine that its initial aggregated data is in fact complete if no other nodes provides updates to its initial aggregated data. Using the utility company example, a first node can process a first set of observations for houses across neighborhoods A, B, and C. A second node can process a second set of observations for houses across neighborhoods A and D. One or both nodes can share initial aggregated data regarding the water usage of neighborhoods A, B, C, and D. The first node can use the data form the second node to generate a complete set of aggregated data for neighborhoods A, B, and C, and may optionally store aggregated data for neighborhood D. The second node can use the data from the first node to generate a complete set of aggregated data for neighborhoods A and D, and may optionally store aggregated data for neighborhoods B and C. Any number of nodes can be used.

When a query is run on the compressed data structure, a determination can be made as to whether the query includes any pre-computed metrics. If so, the pre-computed metric can be accessed. If the query requires use of the aggregated data, the aggregated data can be accessed (e.g., for display or further computation). In some cases, the query can require use of supplemental data, such as display or further computation based on retained data (e.g., water usage data for the 75th quantile) or distribution data (e.g., data for recreating a distribution of water usage), in which cases the supplemental data can be accessed. A response to the query can be generated based on the various accessed data.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
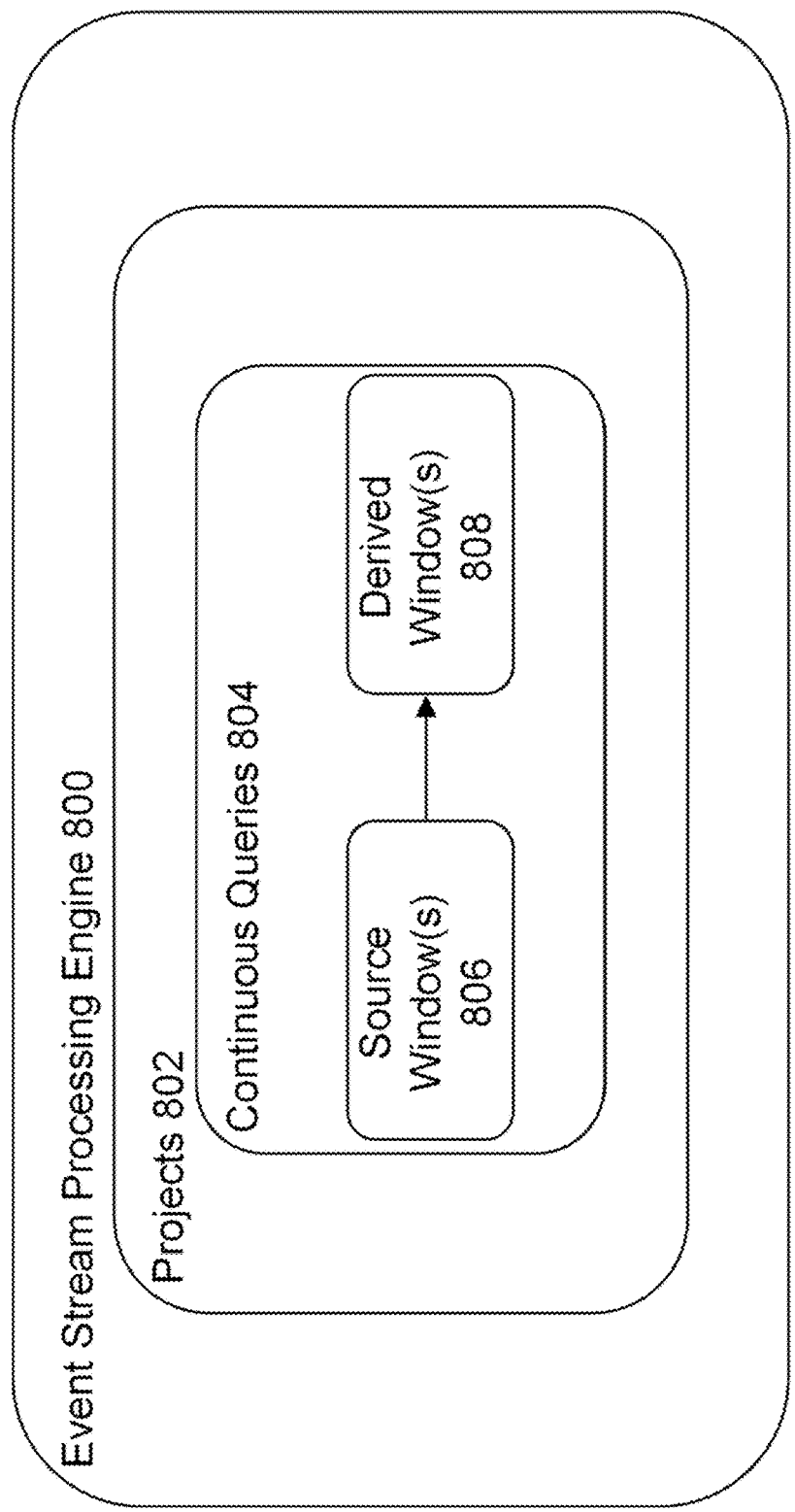
FIG. 8 illustrates a block diagram including components of an Event Stream Processing Engine (ESPE), according to embodiments of the present technology.
Figure 9:
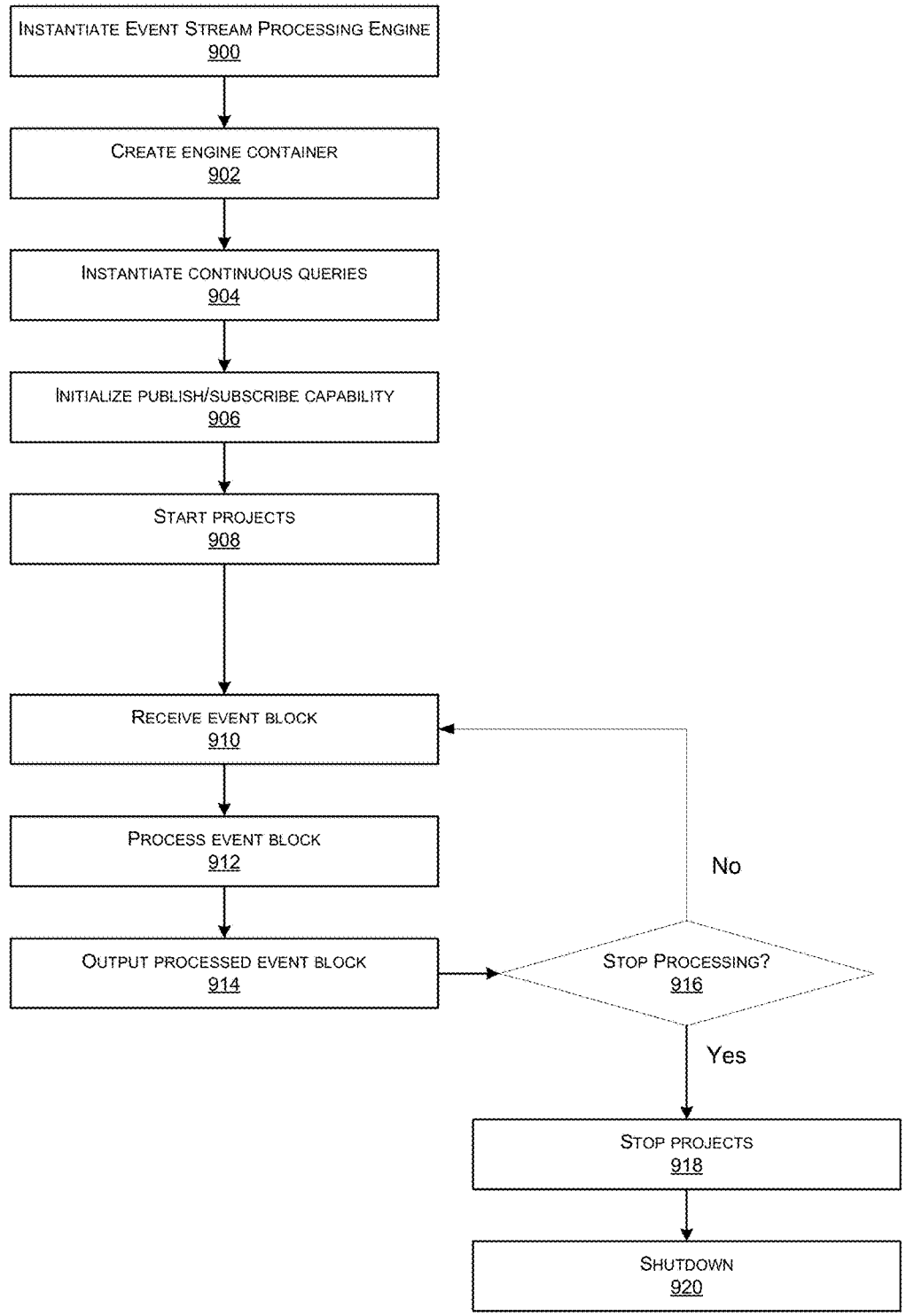
FIG. 9 illustrates a flow chart showing an example process including operations performed by an event stream processing engine, according to some embodiments of the present technology.
Figure 10:
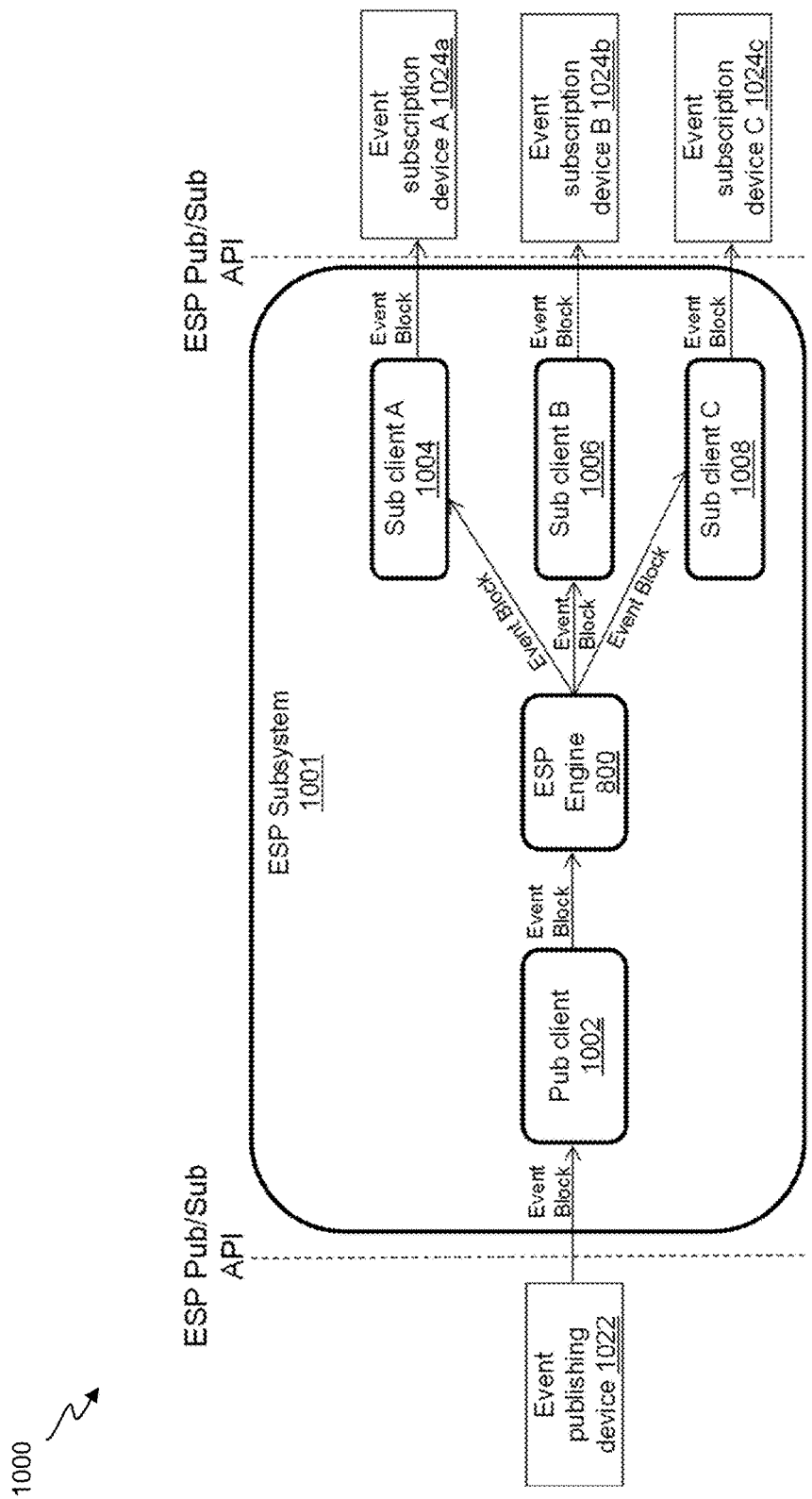
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
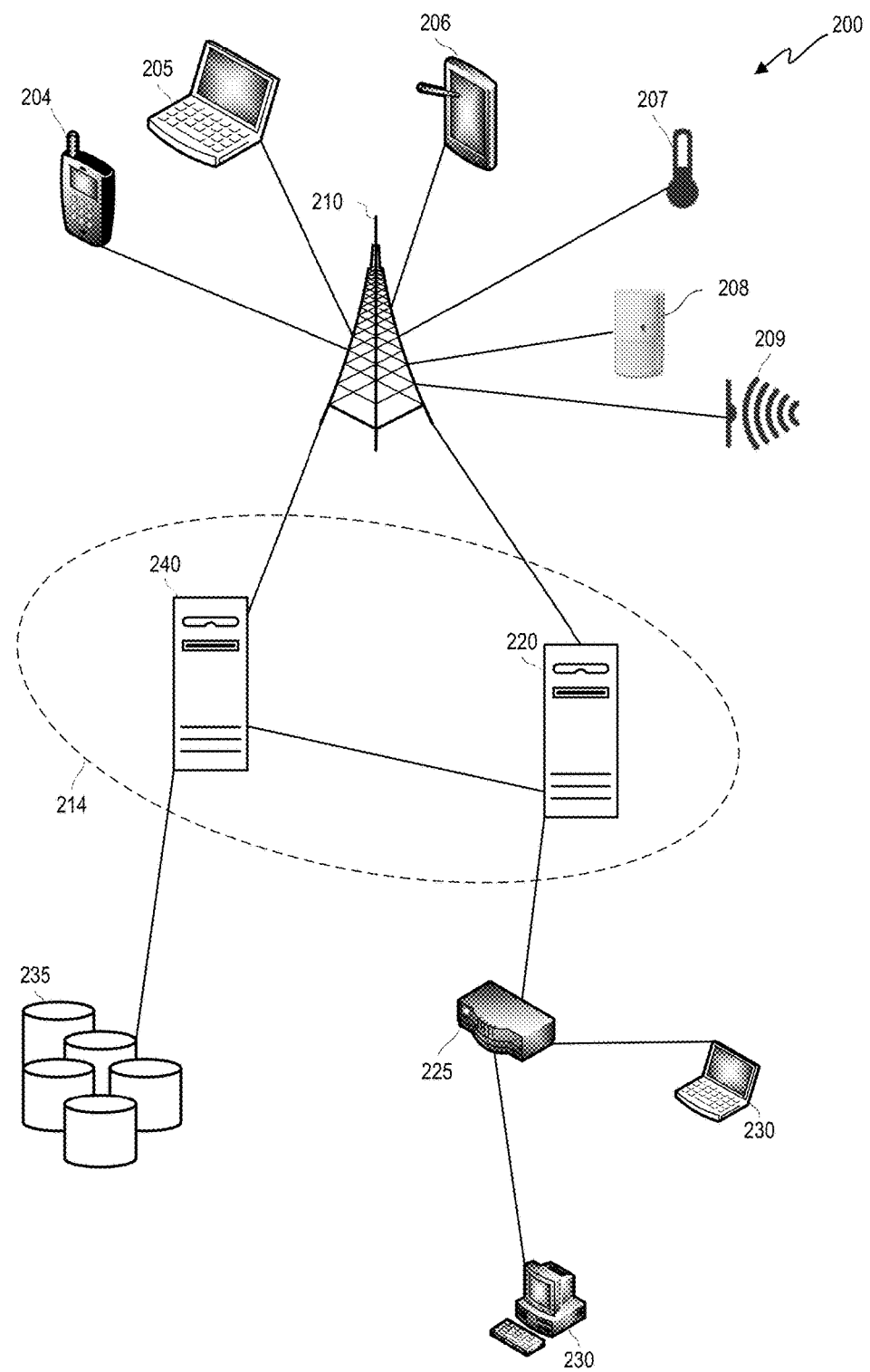
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
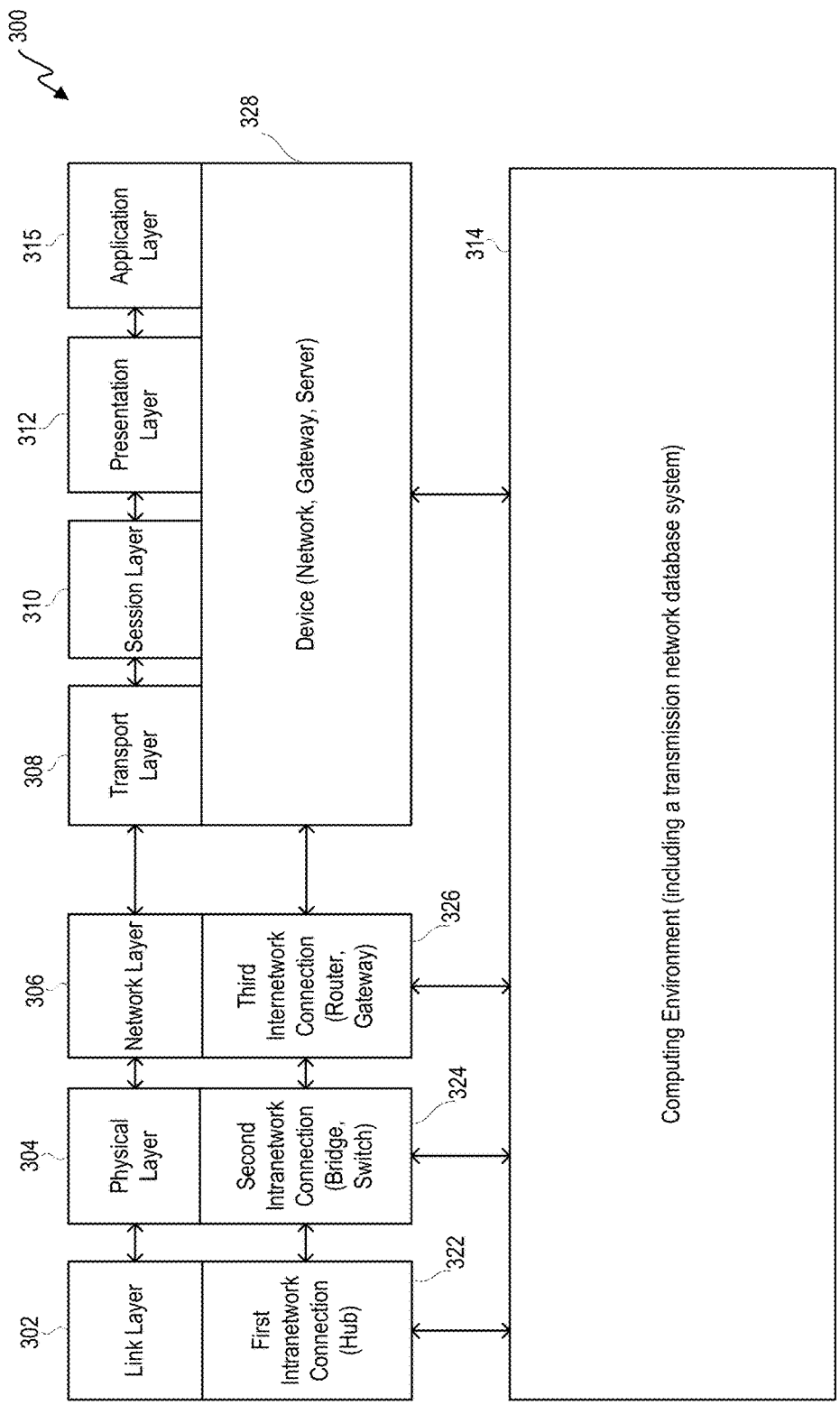
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 315 interacts directly with software applications and end users, and manages communications between them. Application layer 315 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-315. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
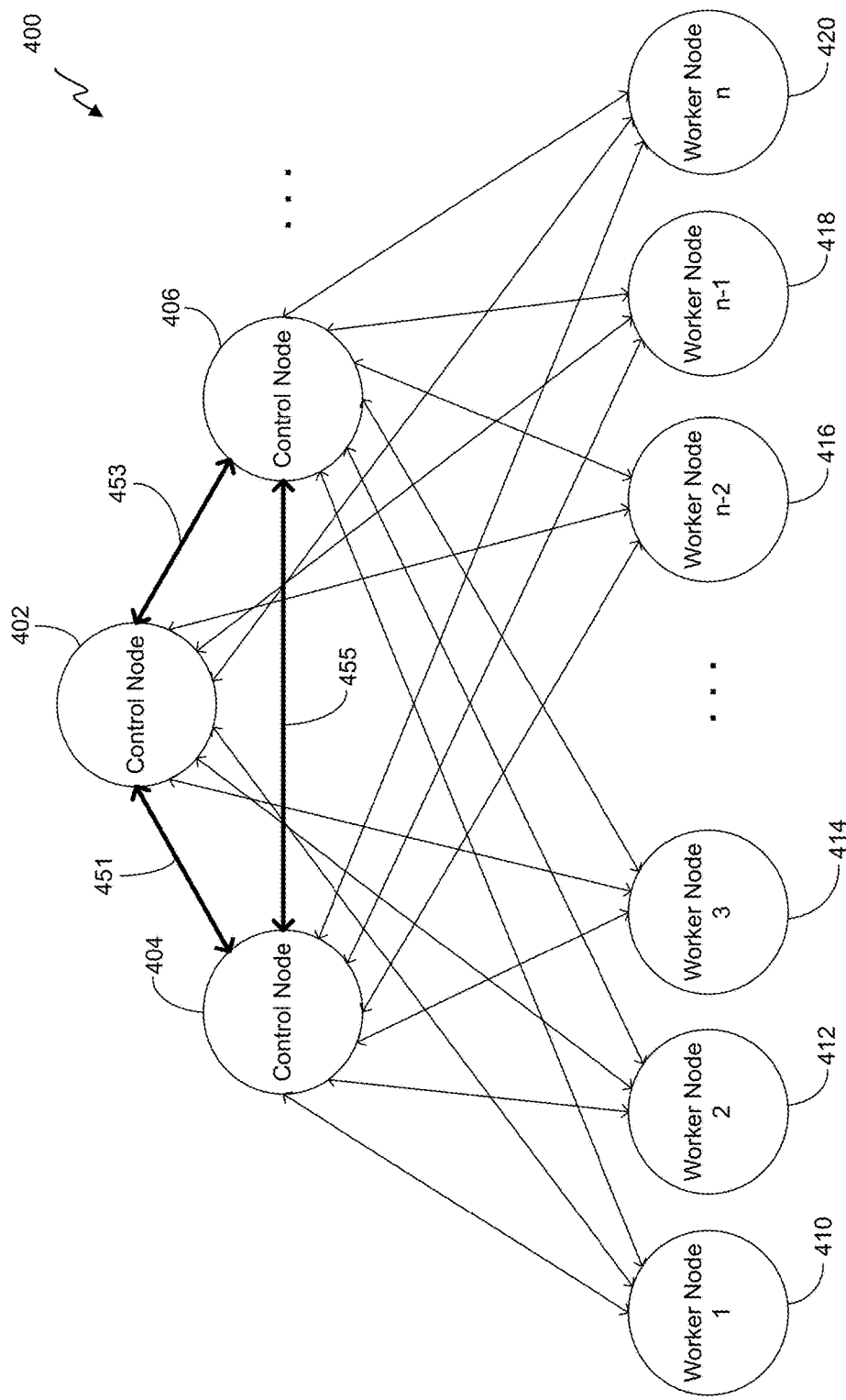
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
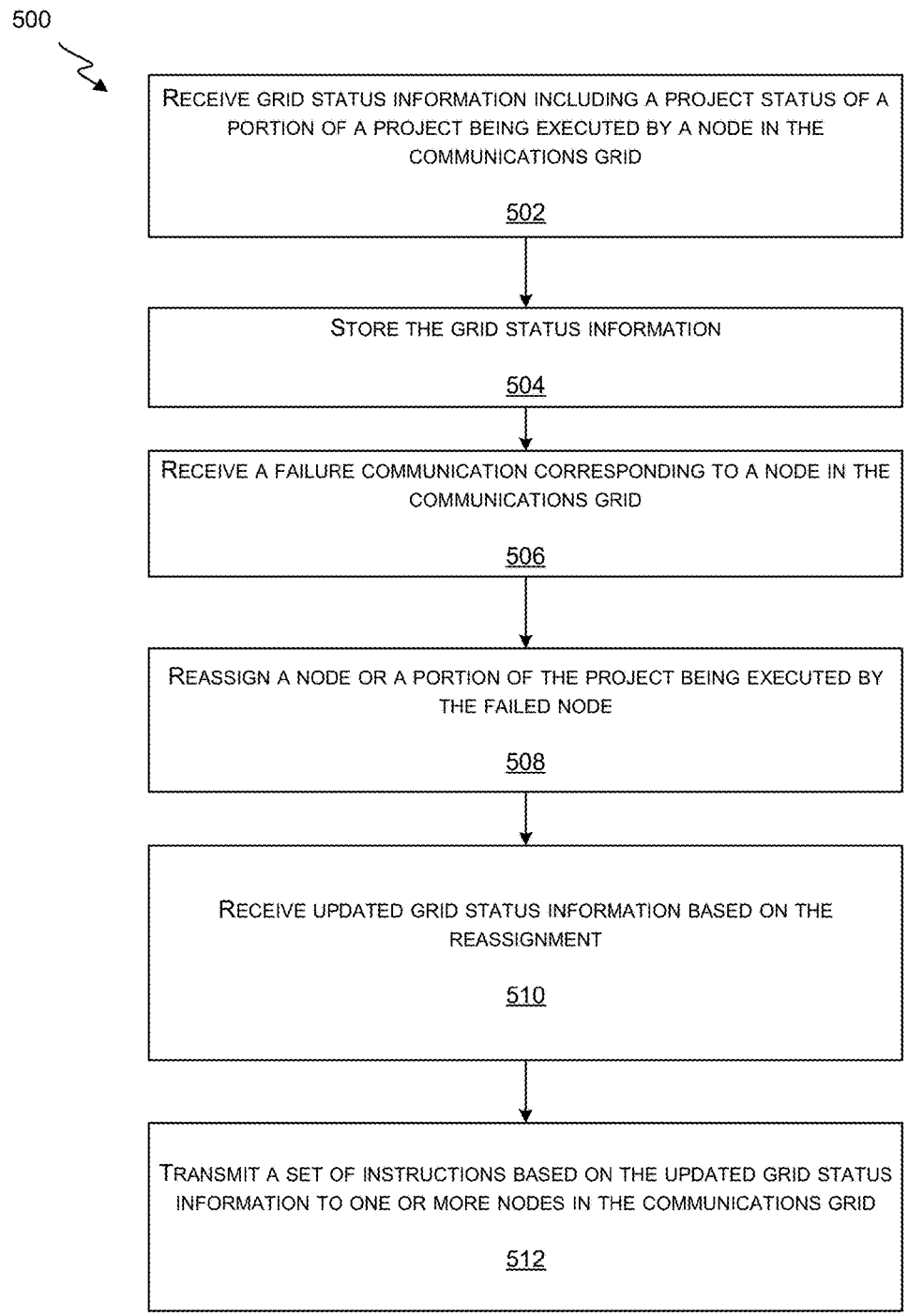
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
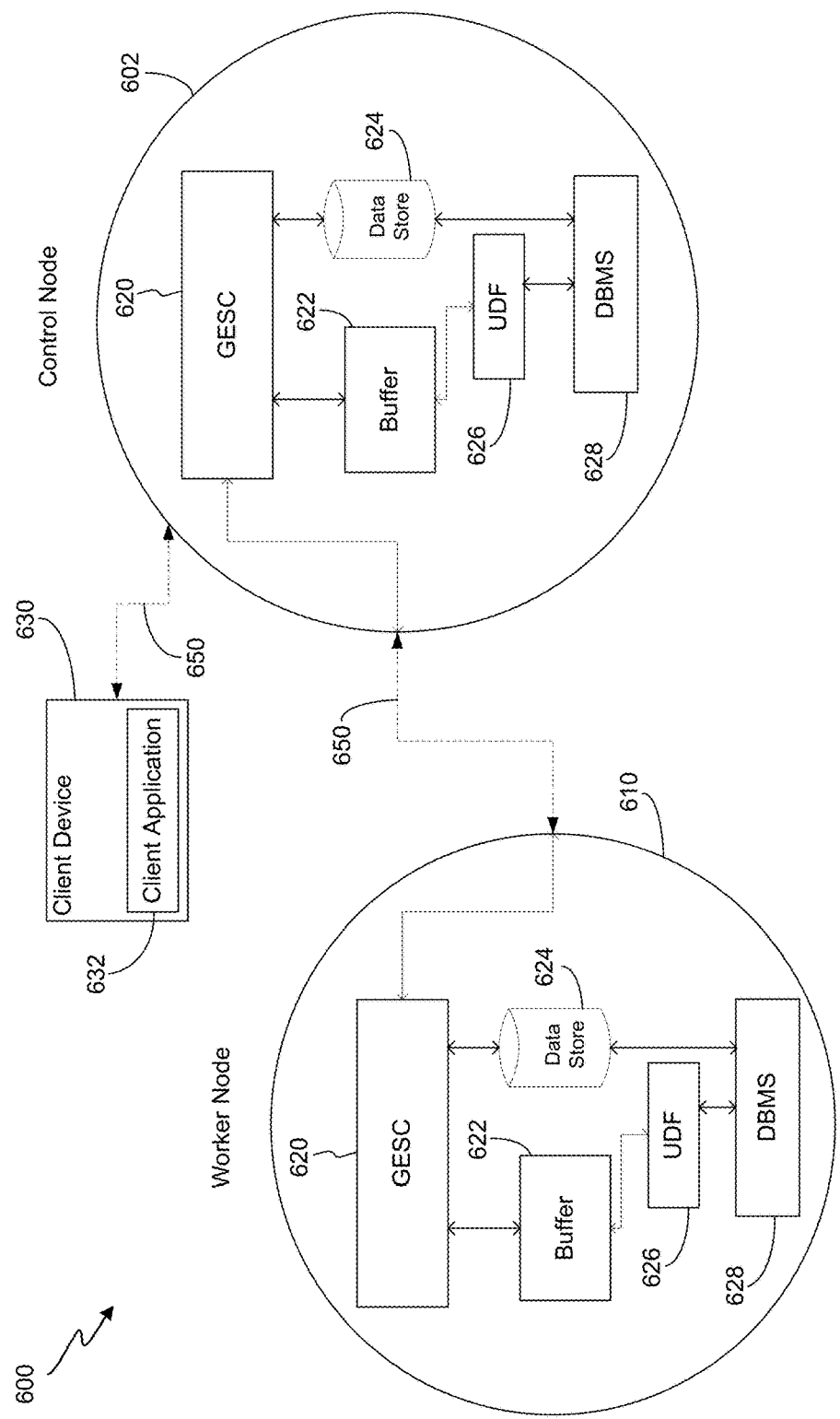
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
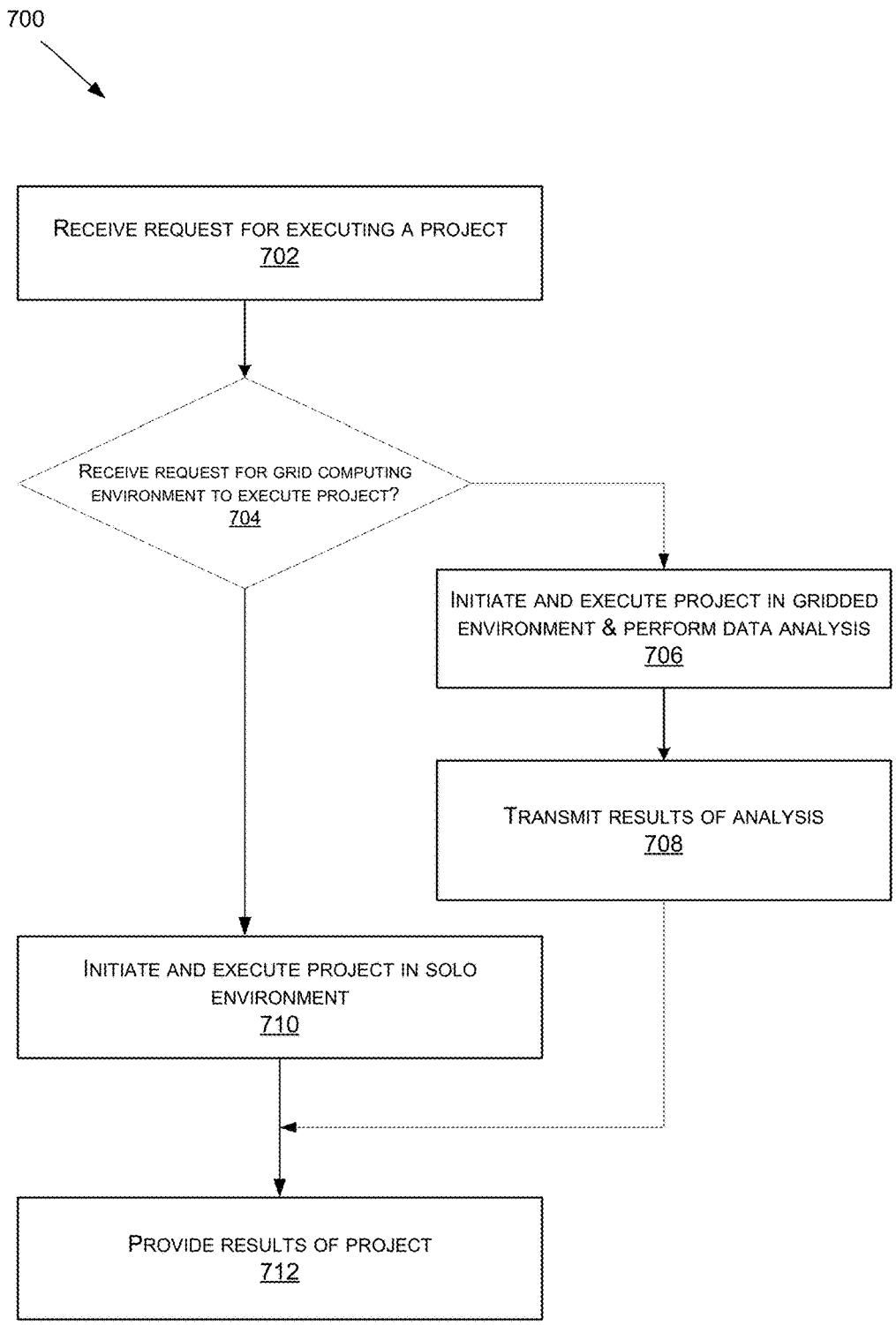
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
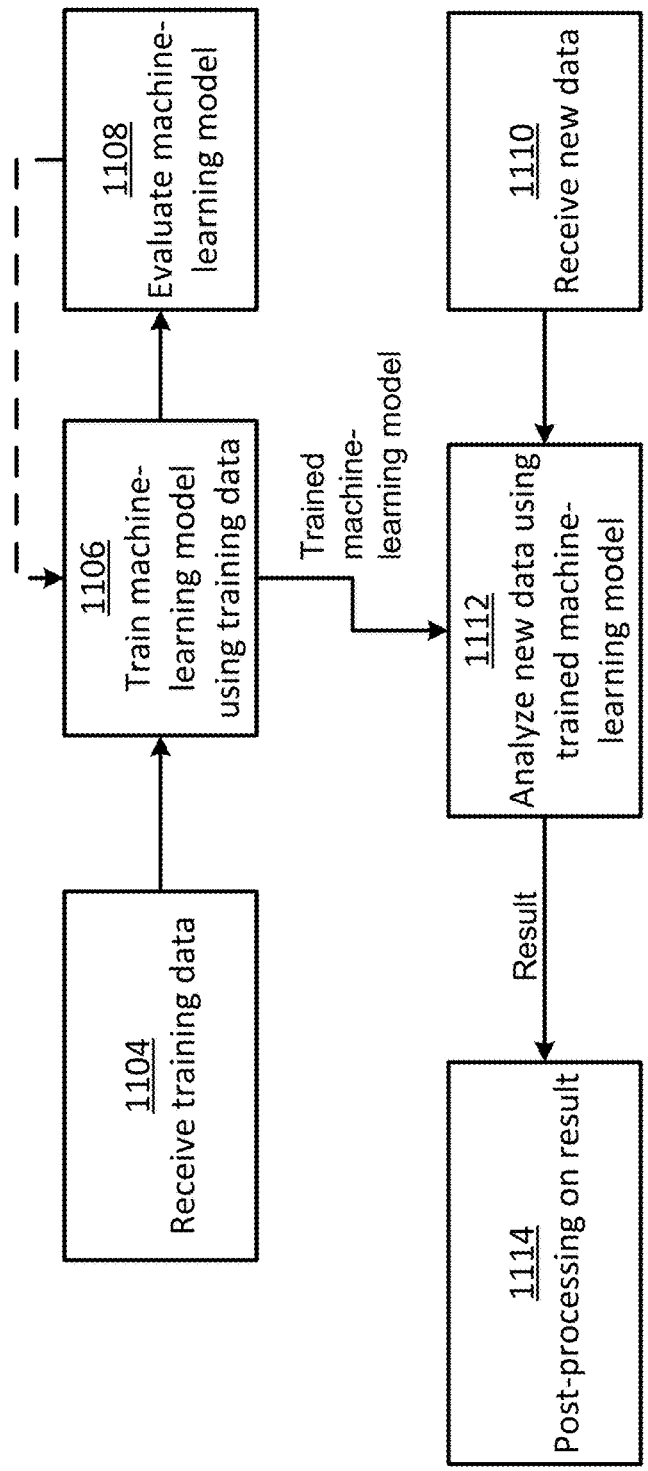
FIG. 11 illustrates a flow chart of an example of a process for generating and using a machine-learning model, according to embodiments of the present technology.

FIG. 11 illustrates a flow chart of an example of a process for generating and using a machine-learning model, according to embodiments of the present technology. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
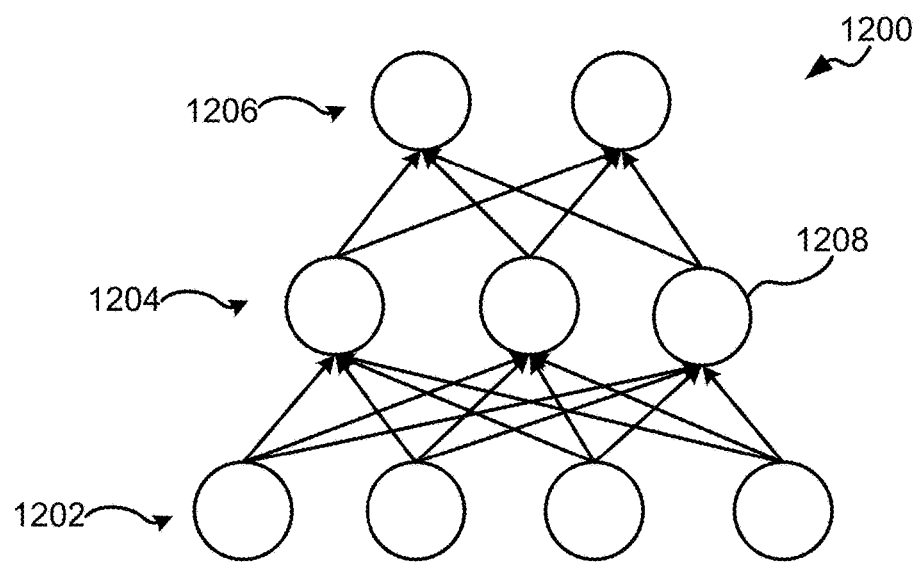
FIG. 12 illustrates a neural network that represents a more specific example of a machine-learning model, according to embodiments of the present technology.

A more specific example of a machine-learning model is the neural network 1200 shown in FIG. 12, according to embodiments of the present technology. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation: $y=\max(x, 0)$, where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
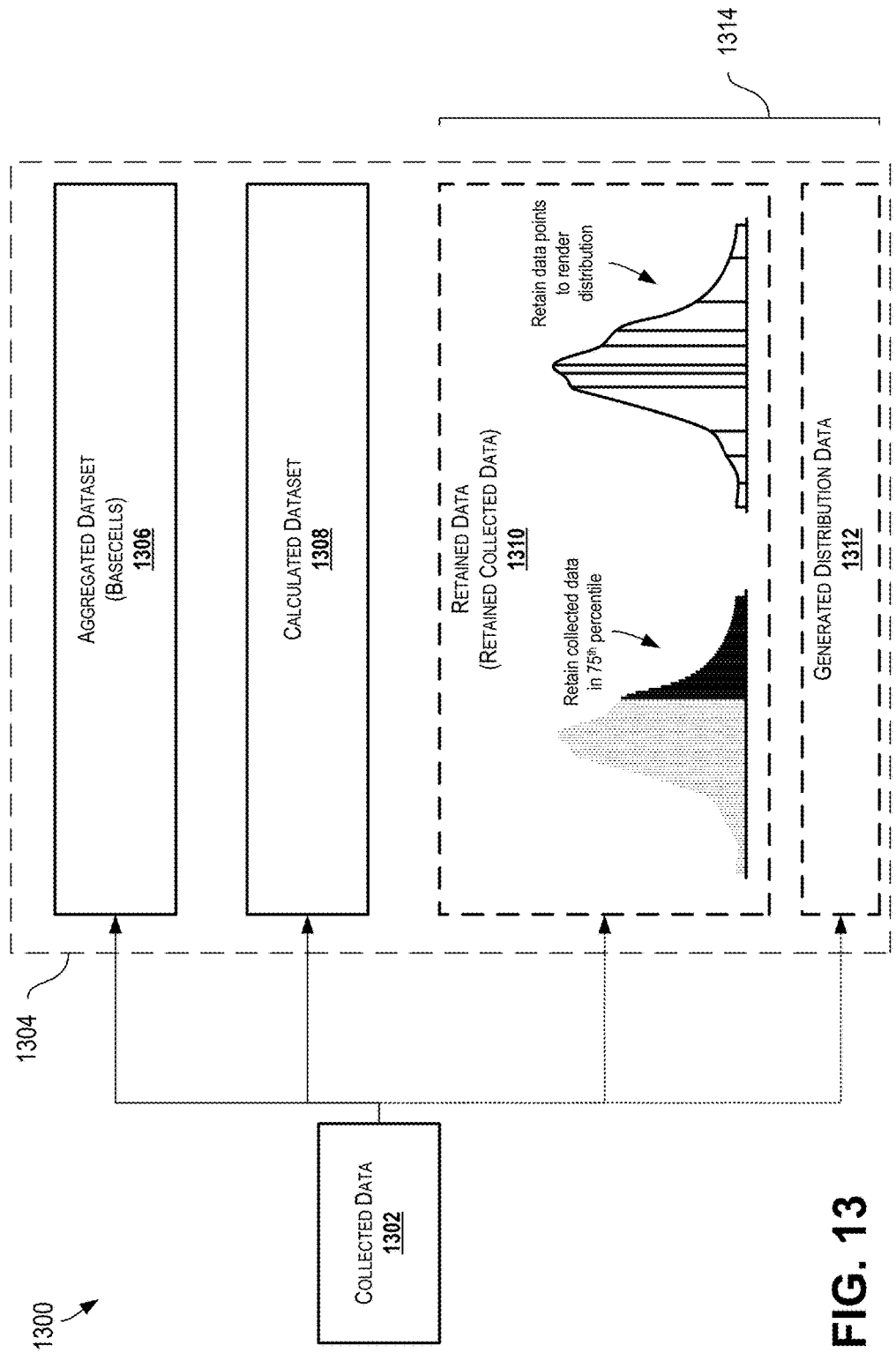
FIG. 13 is a schematic diagram depicting a transformation from collected data into a compressed data structure, according to certain aspects of the present disclosure.

FIG. 13 is a schematic diagram depicting a transformation 1300 from collected data 1302 into a compressed data structure 1304, according to certain aspects of the present disclosure. The collected data 1302 can contain numerous data points representing numerous records. The collected data 1302 can include or otherwise be associated with multiple observations (e.g., a set of observations) for each of a number of records. In the utility company example, collected data may include numerous observations (e.g., daily water usage observations) for each of a number of records (e.g., individual customers). In some cases, collected data 1302 can be a complete set of data (e.g., static data), which may be already stored in a location. In other cases, however, collected data 1302 can include incoming, streaming data (e.g., dynamic data). Aspects of the present disclosure permit the collected data 1302 to be transformed into a compressed data structure 1304 that minimizes storage and processing expense (e.g., minimizing storage space and processing time). The compressed data structure 1304 can include multiple parts, which can be organized into multiple tables or otherwise stored.

The compressed data structure 1304 can include an aggregated dataset 1306, which can comprise basecells. As used herein, the term "basecells" can refer to data (e.g., cells of data) associated with a particular base level of aggregation. In other words, each basecell is associated with a unique combination of values for the variables (e.g., dimension variables) used to define the base level of aggregation. For example, in a dataset containing data about individuals in a state, the data can be compiled at the individual level, a county level, a city level, a state level, or any other suitable level. If one only ever needs to analyze information on the city level, and never on the individual level, the data may be aggregated into a base level that is the city level. Thus, the basecells would be associated with data attributable to each city in the dataset, rather than each individual in the dataset. In some cases, a base level of aggregation can be based on one or more variables which may be related, such as in a hierarchy (e.g., city to state), however that need not always be the case. In some cases, the variables used to define the base level of aggregation can be otherwise unrelated. For example, if it was important to retain information on the city level and from different age brackets, a base level may be associated with both a city variable and an age bracket variable. Thus, the basecells would be associated with data attributable to each combination of city and age bracket that exists in the dataset.

The aggregated dataset 1306 represents data from the collected data 1302 that has been aggregated together based on a selected dimension variable. The collected data 1302 can have a number of dimension variables. Thus, the aggregated dataset 1306 will occupy at least the same or less space than the collected data 1302. The dimension variable can be selected as described herein. For each grouping of records in the collected data that share a common value for the selected dimension variable (e.g., customers in the same neighborhood), the aggregated dataset can include a single set of observations generated by adding together the respective observations from each in that grouping of records.

The compressed data structure 1304 can include a calculated dataset 1308. The calculated dataset 1308 can include pre-computed results, across any number of desired metrics, for individual records of the collected data 1302. Examples of metrics stored in the calculated dataset 1308 can include mean, minimum, maximum, standard deviation, and other quantile measure, although any other suitable computable-statistic can be used. The pre-calculated metrics can be calculated for each record of the collected data 1302. For example, a utility company may store its collected data in a compressed data structure with basecells aggregated by neighborhood (e.g., the selected dimension variable) and pre-calculated metrics computed for each house (e.g., the aggregation at a level more granular than the dimension variable).

In some cases, the compressed data structure 1304 can optionally include supplemental data 1314. Supplemental data 1314 can include retained data 1310 and generated distribution data 1312, although other data can be used. Retained data 1310 can include data from the collected data 1302 that is retained or stored at levels that are more granular than the aggregated dataset 1306. The retained data 1310 can include collected data 1302 that is stored as-is or in a comparable format maintaining suitable granularity (e.g., maintaining at least more granularity than the aggregated dataset 1306). In some cases, retained data 1310 can retain a certain set of data from the collected data 1302, such as data in the $75^{th}$ percentile. In some cases, data from the extreme regions (e.g., lowest and/or highest quantiles) may be of especially high interest or concern, and may thus be retained. However, the choice of retained data need not always be based on quantiles or percentiles. Other criteria can be used. In some cases, retained data 1310 can include a sufficient number of data points necessary to render a distribution of the collected data 1302, without retaining all of the collected data 1302. In some cases, the supplemental data 1314 can include generated distribution data 1312, which can include computed data points that can be used to recreate a distribution associated with the a distribution of the collected data 1302. These computed data points may not occur in the original collected data 1302.

Figure 14:
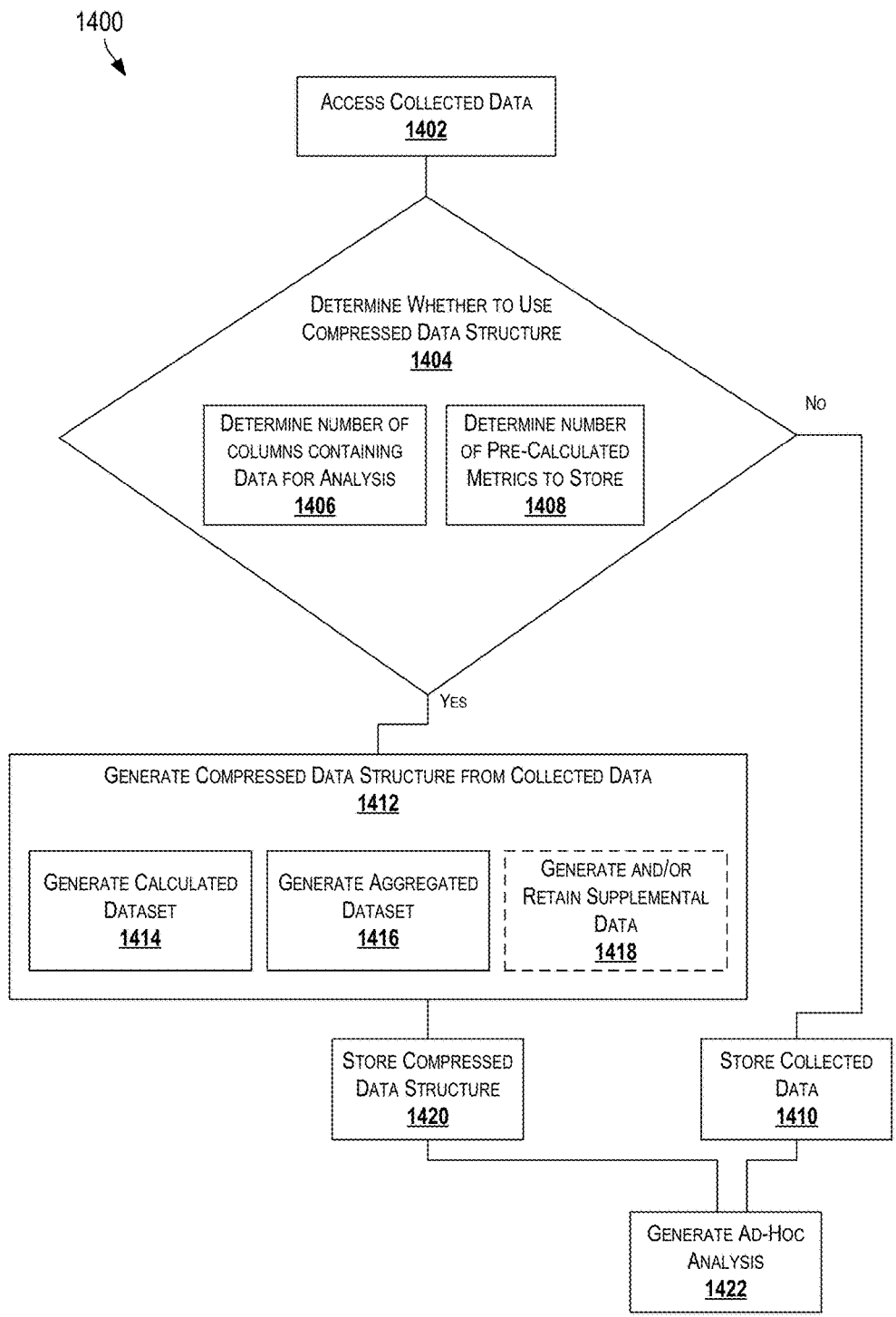
FIG. 14 is a flowchart depicting a process for generating a compressed data structure according to certain aspects of the present disclosure.

FIG. 14 is a flowchart depicting a process 1400 for generating a compressed data structure according to certain aspects of the present disclosure. At block 1402, collected data can be accessed. Accessing collected data can include accessing stored data and/or receiving new data.

At block 1404, a determination can be made as to whether or not to use the compressed data structure. The determination can be dynamically made automatically or with user input. The determination can be made based on any suitable criteria, such as expected reduction in space and/or processing time. In some cases, making the determination at block 1404 can include estimating a reduction in storage space (e.g., estimating that a reduction in storage space will occur and/or estimating an amount of a reduction in storage space). In some cases, making the determination at block 1404 can include determining a number of columns containing data for analysis at block 1406 (e.g., number of observations per record) and determining the number of pre-calculated metrics to store at block 1408. A comparison can be made between the number of columns and the number of metrics. If the number of columns determined at block 1406 exceeds the number of pre-calculated metrics to store 1408 by zero or by some number (e.g., 1, 2, 3, 4, 5, or any other suitable number, such as a pre-selected number or a percentage-based number), then the determination can be made to proceed with using the compressed data structure. In some cases, the determination can be based on calculating an expected reduction in space and/or processing time, in which case the expected reduction can be used to automatically make the determination (e.g., use the compressed data structure if it will occupy less space than the collected data itself) or can be presented to a user for confirmation as to whether or not the compressed data structure should be used. The expected reduction in space and/or processing time can be based on a difference between a calculation of the amount of space needed for the uncompressed data (e.g., the collected data) and a calculation of the amount of space needed for the compressed data structure. The amount of space needed for the compressed data structure can be based on the size of the aggregated dataset (e.g., based on the number of unique basecells) and the pre-calculated metrics (e.g., based on the number of selected metrics to analyze and number of individual records).

If the determination at block 1404 is to not use the compressed data structure, then the collected data itself can be stored at block 1410. At a later time, a query requesting information based on the collected data 1402 can access the stored collected data 1410 to generate an ad-hoc analysis at block 1422.

If the determination at block 1404 is to proceed with using a compressed data structure, the compressed data structure can be generated from the collected data at block 1412. Generating the compressed data structure can include generating a calculated dataset (e.g., pre-calculating selected metrics) at block 1414, generating an aggregated dataset at block 1416, and generating and/or storing supplemental data (e.g., retained data) at block 1418.

In some cases, generating the calculated dataset at block 1414 can include selecting a set of desired metrics (e.g., minimum, maximum, average, standard deviation, and other statistics) to pre-calculate, which can include one or more metrics or at least two metrics. Determining the set of desired metrics can be based on user-input. Generating the calculated dataset at block 1414 can further include identifying unique records (e.g., tuples) of the collected data 1402 and computing values for each of the desired metrics for each of the unique records. The computed values for each of the desired metrics can be stored for each unique record in the calculated dataset. The calculated dataset can be stored as a table as part of the compressed data structure. In some cases, additional information can be stored along with the calculated dataset to facilitate updating of the calculated dataset. For example, to update certain averages, it can be helpful to store the number of observations or a total count of the observed data (e.g., units of water used).

At block 1416, an aggregated dataset (e.g., pre-aggregated data) can be generated. In some cases, generating an aggregated dataset at block 1416 can include selecting a dimension variable for aggregation. Selecting the dimension variable can include using a pre-set dimension variable or prompting a user for a pre-set dimension variable. In some cases, if a user was prompted to determine whether or not to use the compressed data structure at block 1404, the dimension variable used or selected at that time can be used as the selected dimension variable at block 1416. In some cases, selecting the dimension variable be performed automatically and/or dynamically, as described herein. Generating the aggregated data at block 1416 can include summing together common observations from each record of the collected data associated with each unique ones of the selected dimension variable (e.g., summing together the set of daily observations from multiple houses in a neighborhood into a single record containing daily observations for the neighborhood). The aggregated data can be stored as a table as part of the compressed data structure.

In some cases, aggregated data can be generated according to multiple dimension variables. In such cases, the aggregation is based on unique combinations of values for the multiple dimension variables. For example, utility observations can be aggregated by neighborhood only, or can be aggregated by neighborhood and type (e.g., residential or commercial). In the former example, both residential and commercial properties would be aggregated into a single row for that particular neighborhood. However, in the later example, the aggregated dataset would include separate rows for residential and commercial properties in that neighborhood. Thus, where aggregation can occur across a single dimension variable between records sharing a common value for that dimension variable, aggregation can similarly occur across multiple dimension variables between records sharing all common values for the selected dimension variables.

At block 1418, supplemental data can be generated and/or retained from the collected data 1402. Supplemental data can be user-selected (e.g., a user can specifically opt to retain all observations for a particular record), can be dynamically selected based on user-provided criteria (e.g., the system can retain all records that end up in a user-selected quantile), or can be automatically selected (e.g., the system can retain records deemed to be outliers or can retain and/or generate data points to recreate a distribution representative of the collected data). The supplemental data can be stored in one or more tables as part of the compressed data structure.

The compressed data structure generated at block 1412, which can include the calculated dataset generated at block 1414, the aggregated dataset generated at block 1416, and optionally supplemental data generated and/or retained at block 1418, can be stored at block 1420. In some cases, the collected data accessed at block 1402 can also be discarded, such as when or after the compressed data structure is stored at block 1420. At a later time, a query requesting information based on the collected data 1402 can access the stored compressed data structure 1420 to generate an ad-hoc analysis at block 1422.

Figure 15:
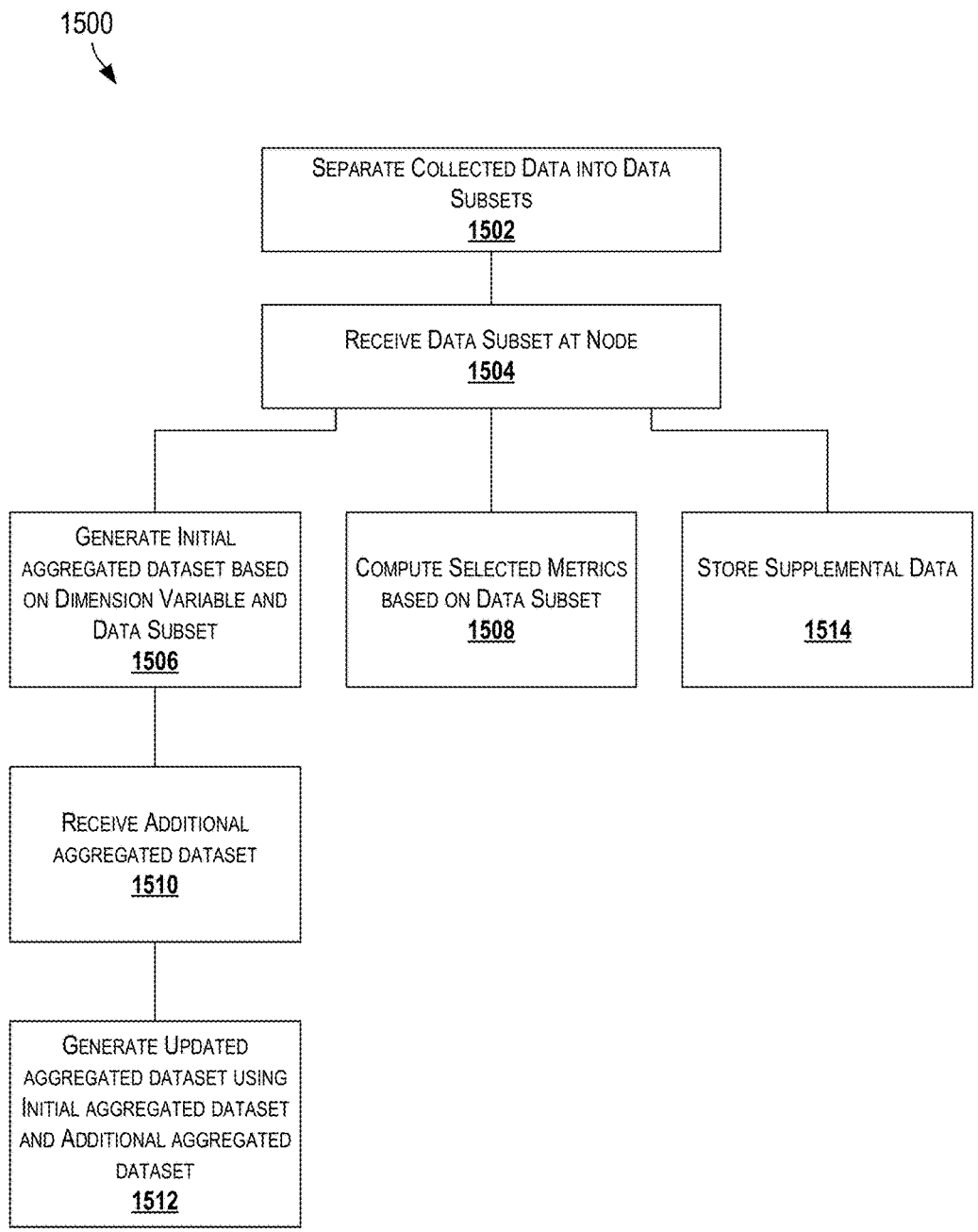
FIG. 15 is a flowchart depicting a process for preparing a portion of a compressed data structure on a distributed node according to certain aspects of the present disclosure.

FIG. 15 is a flowchart depicting a process 1500 for preparing a portion of a compressed data structure on a distributed node according to certain aspects of the present disclosure. In some cases, certain aspects of the present disclosure can be performed using distributed computing systems, as described herein. In some cases, the generation and storage of the compressed data structure can occur across multiple nodes.

At optional block 1502, the collected data can be separated into data subsets. A data subset can include one or more records of the collected data. Each data subset can be unique. In some cases, separating collected data can include separating the collected data into groups of records (e.g., subsets of rows of a table). Each data subset can include a group of records, which can include all observations for each of those records. In this fashion, the observations for any particular record in the collected data is not split between nodes. By maintaining all observations for a particular record on a single node (e.g., co-locating the data for a particular record), overall performance can be improved. However, in some cases, observations can be split between nodes.

Each data subset can be transmitted to a unique node computer. In some cases, separating the collected data into data subsets can occur at one or more nodes or at a controlling computing device. In some cases, however, collected data can be individually collected at various nodes directly, without necessarily being actively separated into subsets from a set of collected data.

At block 1504, a data subset is received at a node. Receiving the data subset can include receiving a portion of the collected data, such as observations for some of the records of the collected data. In some cases, receiving a data subset can include receiving a subset of records, including all observations for each of the records. The data subset can include a number of records.

At block 1506, an initial aggregated dataset can be generated based on a selected dimension variable and the data subset. The initial aggregated dataset can be generated by aggregating respective observations for each of the records in the data subset that share a common value for the selected dimension variable. In some cases, each record of the data subset may have a unique value for the selected dimension variable in the data subset, in which case the initial aggregated dataset may be identical or similar to the data subset itself. As described herein, in some cases the initial aggregated dataset can be updated or appended as new records of the data subset are processed. The initial aggregated dataset can be represented as a table containing rows for each unique value of the dimension variable found in the data subset and columns for the aggregated observations associated with each row.

At block 1508, selected metrics can be computed based on the data subset. The selected metrics can be based on a selected set of metrics (e.g., a list a desired metrics or statistics, such as those often requested for ad-hoc analysis). At block 1508, each metric in the selected set of metrics can be computed for each record of the data subset. These computed metrics for each record of the data subset can be stored as a calculated dataset for that particular data subset. The calculated dataset for that particular data subset can be represented as a table containing rows for each record of the data subset and columns for each of the computed metrics associated with each row.

At block 1510, a node can receive an additional aggregated dataset. The additional aggregated dataset can be received from another node or another source. The additional aggregated dataset can represent an initial aggregated dataset that was generated on another node based on a different, unique data subset. In some cases, the node can discard any additional aggregated dataset containing no common values for the selected dimension variable, although that need not be the case.

Upon receiving the additional aggregated dataset, the node can update its initial aggregated dataset to generate an updated aggregated dataset at block 1512. Generating the updated aggregated dataset can include updating the aggregated observations for reach row of the initial aggregated dataset using the additional aggregated dataset. For example, if both the initial aggregated dataset and the additional aggregated dataset included daily water observations for "Neighborhood A" (e.g., observations aggregated from one or more homes having the dimension variable "Neighborhood A"), generating the updated aggregated dataset can include adding together the respective observations for "Neighborhood A" from both the initial aggregated dataset and the additional aggregated dataset. Any number of datasets can be received at block 1510 and updated at block 1512, and blocks 1510 and 1512 can repeated numerous times. In some cases, the updated aggregated dataset generated at block 1512 and/or the initial aggregated dataset from block 1506 can be transmitted to the other node from which the additional aggregated dataset is received.

In some cases, generating the updated aggregated dataset can include appending the initial aggregated dataset with new rows associated with values for the selected dimension variable that do not appear in the data subset, but which do appear in the additional aggregated dataset. In such cases, updating the aggregated dataset can include merging the initial aggregated dataset with the additional aggregated dataset.

In some cases, supplemental data can be stored at block 1514. Storing supplemental data can include retaining data from the data subset and/or generating new data based on the data from the data subset. For example, supplemental data can include entire records of the data subset stored as retained data or new data points generated to recreate or approximate a distribution associated with the data subset. Storage of supplemental data can occur before, after, or simultaneously with blocks 1506, 1508.

In some cases, process 1500 can permit compressed data structures to be generated rapidly and easily with minimal processing time (e.g., because each row can be processed only once to both generate an aggregated dataset, such as in block 1506, and compute selected metrics, such as in block 1508). Further, the distributed nature of process 1500 can permit parallelization of generating, storing, and using the compressed data structure, which can provide substantial benefits to processing time (e.g., processing time to generate the compressed data structure and processing time to retrieve responses to queries). The distributed nature of process 1500 can facilitate generation and delivery of a response to a query at rapid speeds.

Figure 16:
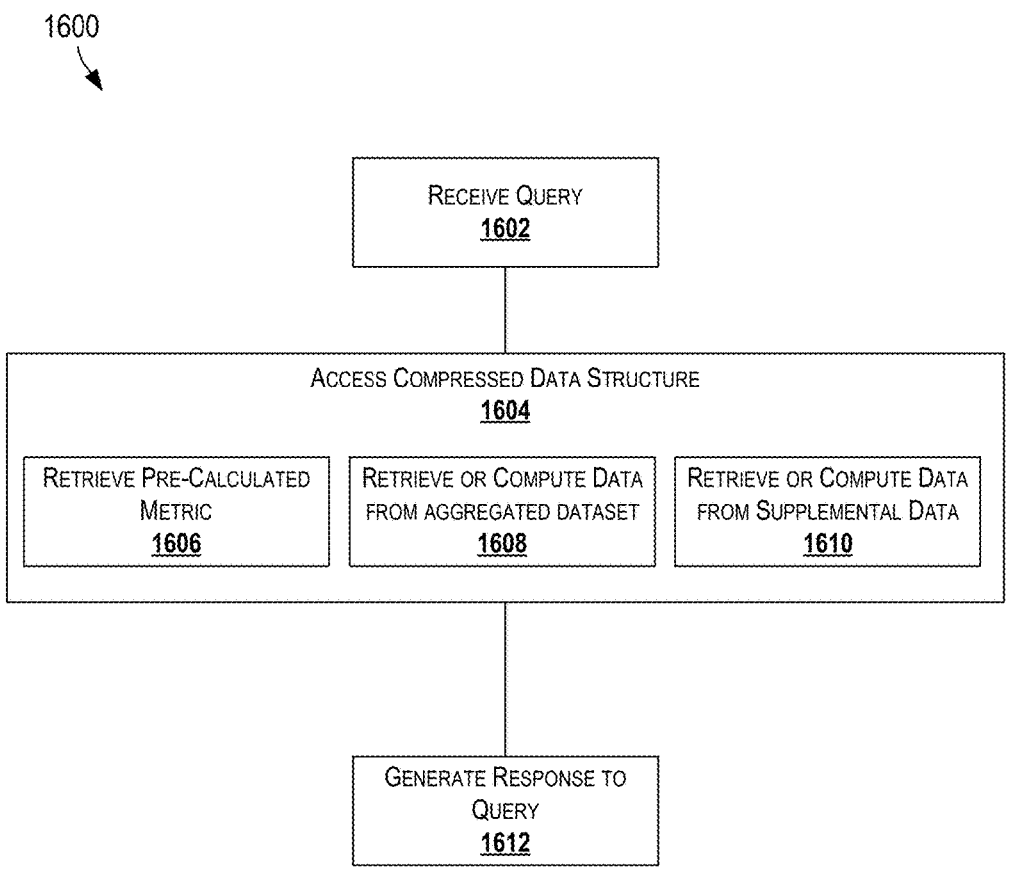
FIG. 16 is a flowchart depicting a process for responding to a query using a compressed data structure according to certain aspects of the present disclosure.

FIG. 16 is a flowchart depicting a process 1600 for responding to a query using a compressed data structure according to certain aspects of the present disclosure. At block 1602, a query can be received. The query can be a request for information associated with the collected data used to generate the compressed data structure.

At block 1604, the compressed data structure can be accessed. Depending on the nature of the query received at block 1602, accessing the compressed data structure can include one or more of retrieving pre-computed metrics at block 1606, retrieving or computing data from the aggregated dataset at block 1606, or retrieving or computing data from the supplemental data at block 1610.

For example, if the query is for a maximum water usage for a particular customer, a pre-computed metric for that customer can be retrieved at block 1606. In another example, if the query is for daily water usage of a particular city over the course of a month, data from the aggregated dataset associated with neighborhoods within the city can be accessed at block 1608 and combined together to provide the result. In another example, if the query is for a neighborhood's daily water usage without taking into account certain specific homes, the pre-computed metrics (e.g., average daily water usage) from the certain homes can be obtained from the pre-computed metrics at block 1606 and subtracted from each daily water usage observation associated with that particular neighborhood, as accessed from the aggregated dataset at block 1608.

At block 1612, a response to the query can be generated based on the results obtained by accessing the compressed data structure at block 1604. In some cases, generating the response to the query can include suitable additional processing to the results obtained by accessing the compressed data structure at block 1604, such as formatting, further calculations, or other processing.

Figure 17:
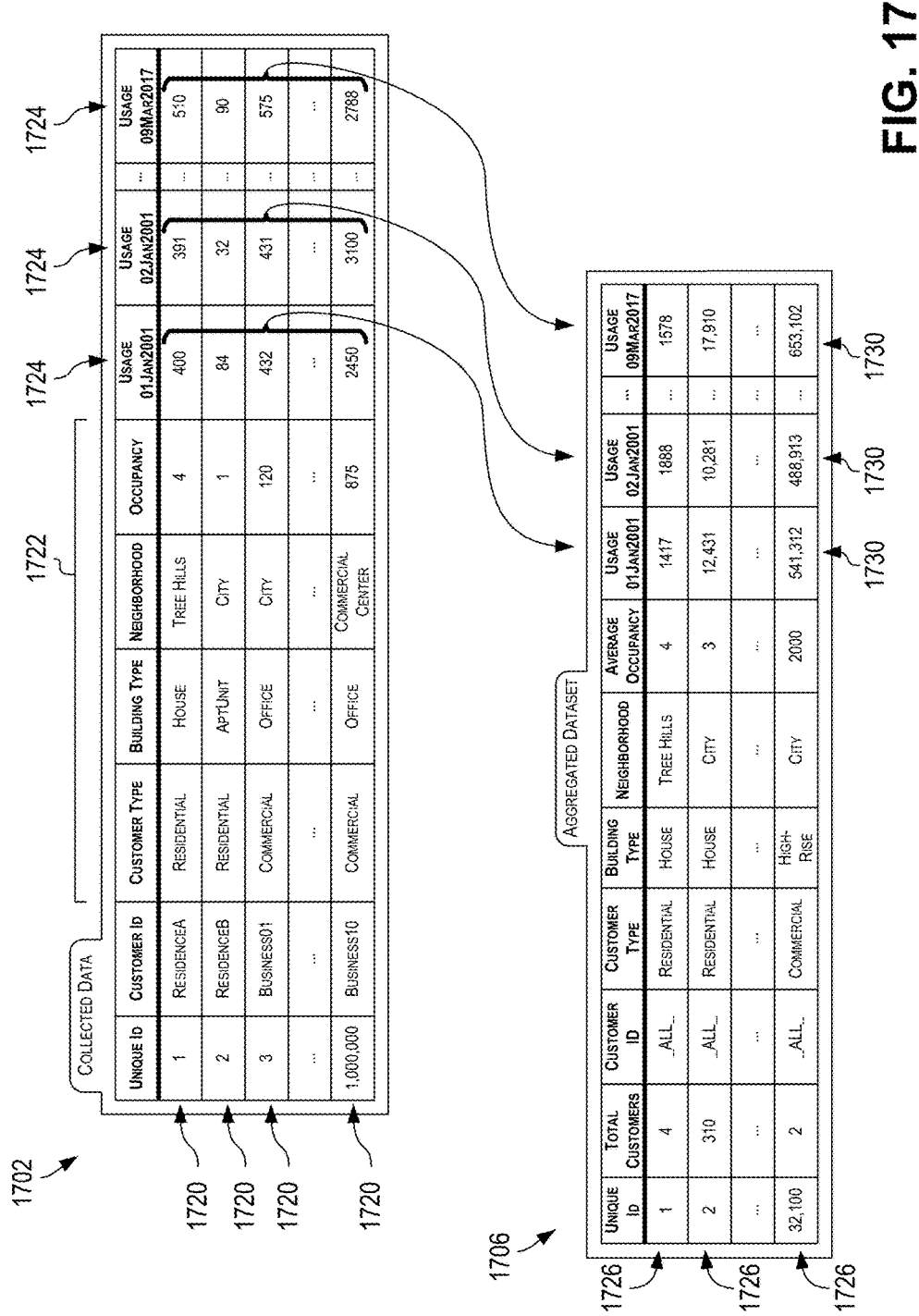
FIG. 17 is a graphical representation of an example table of collected data and an example aggregated dataset according to certain aspects of the present disclosure.

FIG. 17 is a graphical representation of an example table of collected data 1702 and an example aggregated dataset 1706 according to certain aspects of the present disclosure. The aggregated dataset 1706 can be obtained by processing the table of collected data 1702 according to aspects of the present disclosure.

The collected data 1702 can include numerous records 1720 depicted as rows of a table. Each record can include a unique identifier, such as a Unique ID or a Customer ID. All information associated with a particular record can be linked or related to a particular unique identifier.

Each record 1720 can include a set of observations, which can include one or more observations 1724, or at least multiple observations 1724. In the depicted example, each record 1720 may represent a utility customer (e.g., household or business) and each observation 1724 may represent water usage for that particular customer on that particular day. It can be seen that the number of observations 1724 may be large and may increase over time, especially with daily observations. In some cases, observations 1724 can be based on other time intervals (e.g., hourly, every minute, or ever second) or can be non-temporal (e.g., not tied to any time interval, such as gas usage for each car trip a car owner takes).

Each record 1720 can also include additional data 1722. The additional data can be used as dimension variables. In the depicted example, additional data 1722 includes Customer Type, Building Type, Neighborhood, and Occupancy.

According to certain aspects of the present disclosure, an aggregated dataset 1706 can be generated from the collected data 1702. The aggregated dataset 1706 can include numerous records 1726 depicted as rows of a table. Each record 1726 can include a unique identifier unrelated to the unique identifiers from the collected data 1702. In some cases, additional unique identifiers from the collected data 1702, such as the Customer ID, may be discarded or otherwise dealt with in the aggregated dataset 1706, as is evident by the "_ALL_" term under each Customer ID in the aggregated dataset 1706. All information associated with a particular aggregated record 1726 of the aggregated dataset 1706 can be linked or related to its associated unique identifier.

Each aggregated record 1726 of the aggregated dataset 1706 can represent aggregated data from all records 1720 of the collected data 1702 that fulfil the dimension variable requirements. As depicted in FIG. 17, the dimension variables of Customer Type, Building Type, and Neighborhood have been selected as selected dimension variables. Thus, each aggregated record 1726 of the aggregated dataset 1706 represents a unique combination of Customer Type, Building Type, and Neighborhood found in the collected data 1702. For example, Unique ID 1 of the aggregated dataset 1706 shows that there are four (4) Total Customers that have a Customer Type of Residential, a Building Type of House, and a Neighborhood of Tree Hills. Any other additional data 1722 from the associated records 1720 of the collected data 1702 can be discarded or adapted for storage and display. As depicted in FIG. 17, the additional data 1722 of Occupancy is shown in the aggregated dataset 1706 as Average Occupancy across the Total Customers for each particular record. Additional data 1722 can be dealt with in other ways, such as a concatenated list.

Each aggregated record 1726 of the aggregated dataset 1706 can include a set of aggregated observations, which can include one aggregated observation 1730 for each respective observation 1724 of the collected data 1702. For a particular aggregated record 1726 in the aggregated dataset 1706, each aggregated observation 1730 can represent a sum of all observations 1724 across each record 1720 of the collected data 1702 that fulfils the dimension variable requirements of that particular aggregated record 1726. For example, with respect to Unique ID 1 of the aggregated dataset 1706, the water usage in Jan. 1, 2001 is shown to be 1417, which is the sum of all water use observations for Jan. 1, 2001 in the collected data 1702 for each of the records 1720 that have a Customer Type of Residential, a Building Type of House, and a Neighborhood of Tree Hills. In other words, the record 1726 associated with Unique ID 1 on the aggregated dataset 1706 provides sufficient information to state that there are four residential homes in the Tree Hills neighborhood, these four homes have an average occupancy of four, and these four homes used 1417 units of water on Jan. 1, 2001. In some cases, each aggregated observation 1730 may represent an associative function or mathematical function other than a sum, such as an average (e.g., average occupancy or usage), minimum (e.g., minimum occupancy or usage), or maximum (e.g., maximum occupancy or usage).

As depicted in FIG. 17, it can be appreciated that the number of observations 1724 stored in the collected data 1702 may be approximately 5.9 billion observations. After aggregation, the number of observations 1730 stored in the aggregated dataset 1706 may be approximately 190 million, or approximately 3.2% of the number of observations 1724 in the collected data 1702. The amount of reduction will depend on the number of records 1720 sharing common values for dimension variable(s). As described herein, in some cases the selected dimension variable(s) can be chosen automatically or with user input based on the amount of reduction provided.

Figure 18:
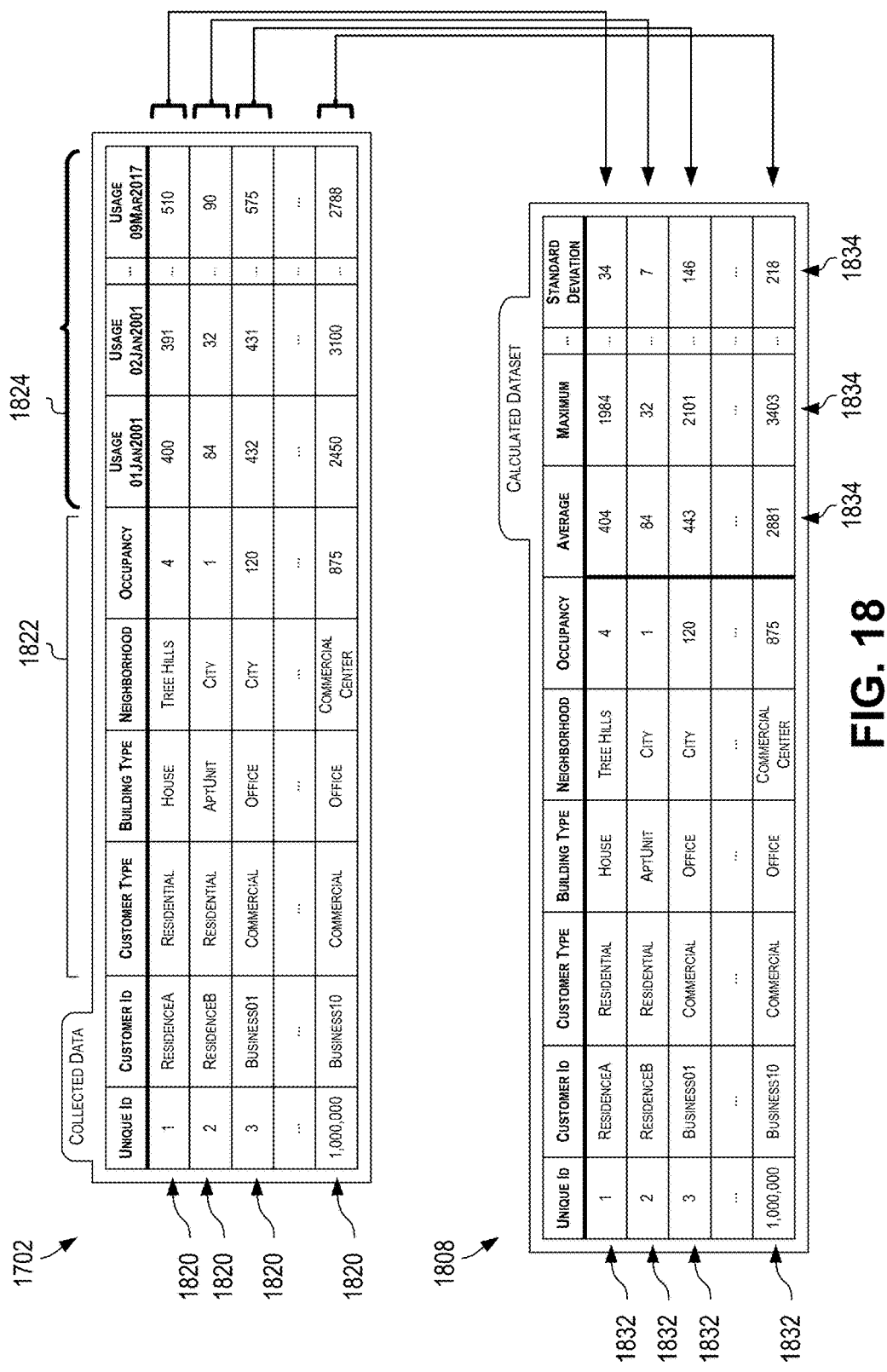
FIG. 18 is a graphical representation of an example table of collected data and an example of a calculated dataset according to certain aspects of the present disclosure.

FIG. 18 is a graphical representation of an example table of collected data 1802 and an example of a calculated dataset 1808 containing pre-calculated metrics according to certain aspects of the present disclosure. The calculated dataset 1808 can be obtained by processing the table of collected data 1802 according to aspects of the present disclosure. The collected data 1802 can be the collected data 1702 of FIG. 17.

The collected data 1802 can include numerous records 1820 depicted as rows of a table. Each record can include a unique identifier, such as a Unique ID or a Customer ID. All information associated with a particular record can be linked or related to a particular unique identifier.

Each record 1820 can include a set of observations 1824, which can include one or more observations, or at least multiple observations. In the depicted example, each record 1820 may represent a utility customer (e.g., household or business) and each observation may represent water usage for that particular customer on that particular day. It can be seen that the number of observations may be large and may increase over time, especially with daily observations. In some cases, observations can be based on other time intervals (e.g., hourly, every minute, or ever second) or can be non-temporal (e.g., not tied to any time interval, such as gas usage for each car trip a car owner takes).

Each record 1820 can also include additional data 1822. The additional data can be used as dimension variables. In the depicted example, additional data 1822 includes Customer Type, Building Type, Neighborhood, and Occupancy.

According to certain aspects of the present disclosure, the calculated dataset 1808 can be computed (e.g., selected metrics computed) from the collected data 1802. The calculated dataset 1808 can include numerous record 1832 depicted as rows of a table. The calculated dataset 1808 can include a respective record 1832 for each record 1820 of the collected data. Each record 1832 can include a unique identifier that is based on or related to the respective unique identifier from the collected data 1802.

Each record 1832 of the calculated dataset 1808 can include pre-computed metrics associated with the set of observations 1824 for the respective record 1820 (e.g., sharing the same Unique ID or Customer ID) of the collected data 1702. Each record 1832 of the calculated dataset 1808 may not include any individual observations (e.g., from the set of observations 1824), but instead includes calculated metrics 1834. Any number of calculated metrics 1834 (e.g., columns) can be stored for each record 1843 (e.g., row). As depicted in FIG. 18, the metrics selected for calculation include at least Average, Maximum, and Standard Deviation. As depicted in FIG. 18, the record 1832 associated with Unique ID 1 shows that the Average water usage is 404 units across all observations in the set of observations 1824 for the record 1820 of the collected data 1802 associated with Unique ID 1.

As depicted in FIG. 18, the unique identifiers and additional data 1822 can be copied directly from the collected data 1802 into the calculated dataset 1808. However, the set of observations 1824 is processed for each record 1820 to generate a set of computed metrics.

As depicted in FIG. 18, it can be appreciated that the number of observations 1824 stored in the collected data 1802 may be approximately 5.9 billion observations. The number of computed metrics 1834 (e.g., cells) in the calculated dataset 1808 (e.g., table) depends on the number of enumerated metrics (e.g., statistical measures) that are selected for pre-computation. For example, if the calculated dataset 1808 of FIG. 18 had included 40 enumerated metrics, than the number of computed metrics 1834 would be 40 million, or approximately 0.7% of the number of observations in the collected data 1802.

Figure 19:
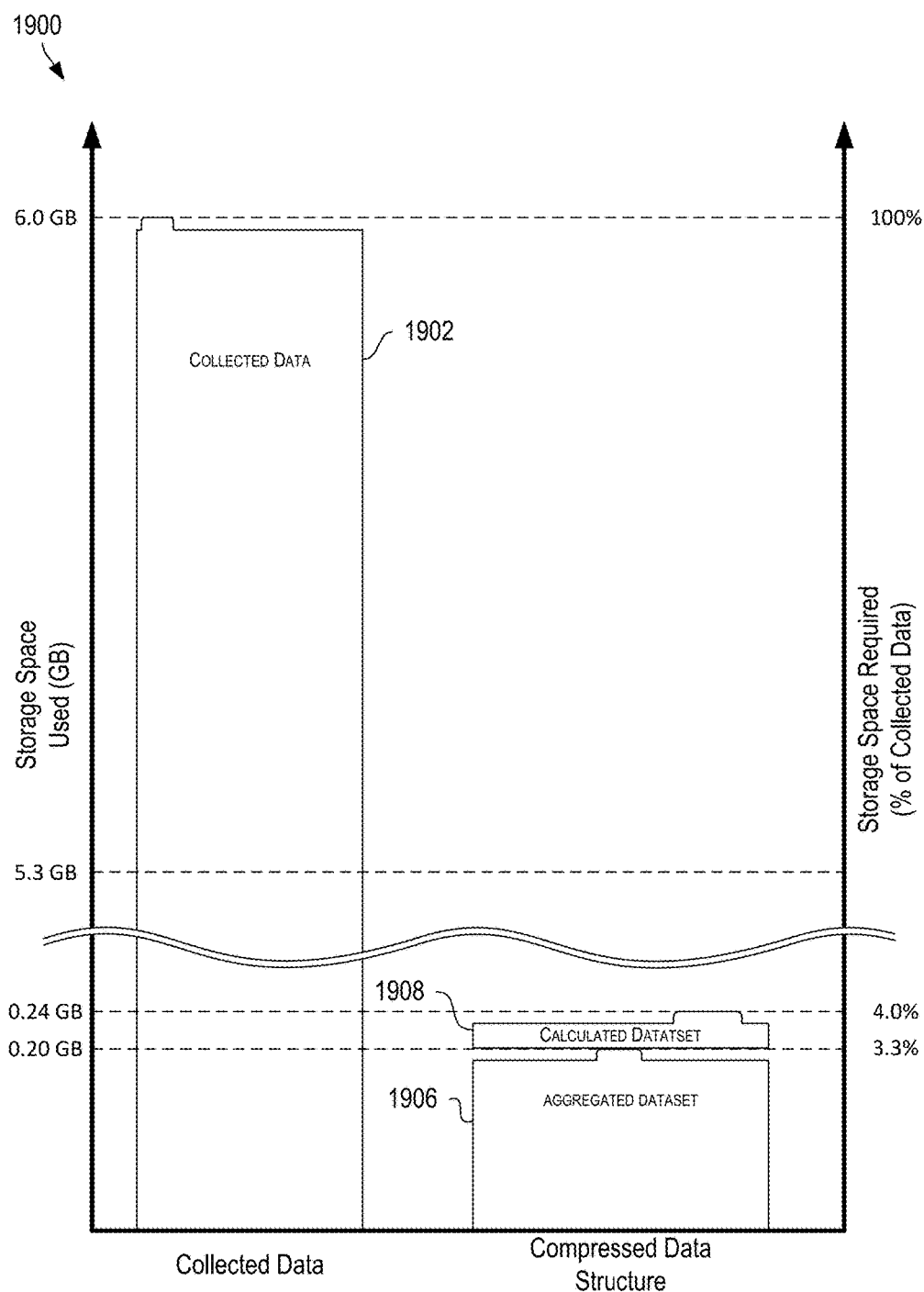
FIG. 19 is a chart depicting storage space usage for an example collected data and a compressed data structure based on that collected data according to certain aspects of the present disclosure.

FIG. 19 is a chart 1900 depicting storage space usage for an example collected data and a compressed data structure based on that collected data according to certain aspects of the present disclosure. The storage space required to store the example collected data 1902 is shown at approximately 6.0 gigabytes. The collected data 1902, once processed and transformed into a compressed data structure according to certain aspects of the present disclosure, occupies much less space. The aggregated dataset 1906 is shown as occupying approximately 0.20 gigabytes, or approximately 3.3% of the size of the collected data 1902. The calculated dataset is shown as occupying approximately 0.04 gigabytes, or approximately 0.7% of the size of the collected data 1902. Overall, the entire compressed data structure occupies approximately 0.24 gigabytes, or approximately 4.0% of the size of the collected data 1902.

Because the compressed data structure occupies much less storage space than the original, collected data 1902, it can be stored with much less expense and can be transferred in its entirety at much higher speeds. Further, since the calculated dataset 1908 include already-computed metrics, certain queries that would otherwise have to process large amounts of data in the collected data 1902 can be addressed in a fraction of the time by simply providing the already-computed metric. Additionally, other queries that may have otherwise required processing every record of the collected data 1902 can be addressed in a fraction of the time by processing the much fewer records of the aggregated dataset 1906.

Overall, the user of a compressed data structure as disclosed herein can dramatically improve performance of ad-hoc analysis and on-demand analysis. The increase speed at which queries can be addressed enable certain on-demand analysis to be used for purposes otherwise impractical. For example, for a presentation, a user desiring to display graphs, charts, or statistical information based on a very large set of collected data would have previously had to prepare such materials well in advance to permit sufficient time for analysis of the entire set of collected data. However, use of the compressed data structure for storing the collected data can permit the user to generate graphs, charts, or statistical information on the fly, such as in response to a question from the user's audience.

Additionally, use of the compressed data structure disclosed herein permits extremely large sets of collected data to be stored and only occupy relatively small amounts of storage space. Therefore, use of the compressed data structure now allows ad-hoc analytics of extremely large sets of collected data to be incorporated into systems that would otherwise be unable to use such ad-hoc analysis due to space constraints (e.g., internet-of-things devices). Also, the compressed data structure can act as a technique for storing vast amounts of incoming data when subject to space constrains (e.g., on internet-of-things devices).

The benefits associated with the compressed data structure disclosed herein are numerous, but are offset by the loss in data resolution. This loss in data resolution corresponds to losing the availability to address each and every original observation at the original level of granularity (e.g., per record granularity). The compressed data structure disclosed herein, however, with its combination of an aggregated dataset and calculated data (e.g., pre-calculated metrics), achieves a beneficial balance between data resolution and computational expense (e.g., storage space, processing time, and bandwidth). The compressed data structure can permit transmission of the information associated with the collected data (e.g., sufficient information to perform ad-hoc data analysis) while using less bandwidth than necessary to transmit the collected data. In some cases, the original, collected data 1902 can be separately stored, at full resolution, for later retrieval (e.g., in a "cold storage" system), such as if a query cannot be addressed correctly or sufficiently using the compressed data structure alone. In other cases, however, the loss in data resolution can be negligible or unimportant, and thus the original, collected data 1902 can be discarded.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a system, comprising: one or more data processors; and a non-transitory computer-readable storage medium containing instructions which, when executed on the one or more data processors, cause the one or more data processors to perform operations including: receiving a query for a property of collected data, wherein the collected data is associated with multiple observations for a plurality of records, and wherein the collected data would occupy a first amount of storage space when stored; accessing a compressed data structure associated with the set of collected data, wherein the compressed data structure includes an aggregated dataset and a calculated dataset, wherein the aggregated dataset contains aggregated observations for the plurality of records having common values for one or more selected dimension variables, wherein the calculated dataset contains pre-calculated metrics derived from the multiple observations for each of the plurality of records, and wherein the compressed data structure occupies a second amount of storage space that is less than the first amount of storage space; generating a response to the query using the compressed data structure; and transmitting the response to the query.

Example 2 is the system of example(s) 1, wherein generating the response includes accessing at least one of the aggregated dataset and the calculated dataset, and wherein the property is retrievable or computable from the compressed data structure.

Example 3 is the system of example(s) 1 or 2, wherein generating the response includes accessing the pre-calculated metrics from the calculated dataset when the property is retrievable from the pre-calculated metrics.

Example 4 is the system of example(s) 1-3, wherein generating the response includes accessing the aggregated dataset when the property is retrievable or computable from the aggregated observations.

Example 5 is the system of example(s) 1-4, wherein the number of pre-calculated metrics for each of the plurality of records in the compressed data structure is fewer than a number of observations associated with each of the plurality of records of the collected data.

Example 6 is the system of example(s) 1-5, wherein the compressed data structure further includes retained data, wherein the retained data includes a selected subset of data from the collected data that is less than all of the collected data, and wherein generating the response to the query includes accessing the retained data.

Example 7 is the system of example(s) 6, wherein the selected subset of data is associated with a particular quantile of the collected data.

Example 8 is the system of example(s) 6, wherein the selected subset of data is usable to recreate a distribution associated with the collected data.

Example 9 is the system of example(s) 1-8, wherein the compressed data structure further includes distribution data, wherein the distribution data includes a plurality of data points is usable to recreate a distribution associated with the collected data.

Example 10 is the system of example(s) 1-9, wherein generating the response includes accessing both of the aggregated dataset and the calculated dataset, and wherein the property is computable from the compressed data structure.

Example 11 is a computer-implemented method, comprising: receiving a query for a property of collected data, wherein the collected data is associated with multiple observations for a plurality of records, and wherein the collected data would occupy a first amount of storage space when stored; accessing a compressed data structure associated with the set of collected data, wherein the compressed data structure includes an aggregated dataset and a calculated dataset, wherein the aggregated dataset contains aggregated observations for the plurality of records having common values for one or more selected dimension variables, wherein the calculated dataset contains pre-calculated metrics derived from the multiple observations for each of the plurality of records, and wherein the compressed data structure occupies a second amount of storage space that is less than the first amount of storage space; generating a response to the query using the compressed data structure; and transmitting the response to the query.

Example 12 is the method of example(s) 11, wherein generating the response includes accessing at least one of the aggregated dataset and the calculated dataset, and wherein the property is retrievable or computable from the compressed data structure.

Example 13 is the method of example(s) 11 or 12, wherein generating the response includes accessing the pre-calculated metrics from the calculated dataset when the property is retrievable from the pre-calculated metrics.

Example 14 is the method of example(s) 11-13, wherein generating the response includes accessing the aggregated dataset when the property is retrievable or computable from the aggregated observations.

Example 15 is the method of example(s) 11-14, wherein the number of pre-calculated metrics for each of the plurality of records in the compressed data structure is fewer than a number of observations associated with each of the plurality of records of the collected data.

Example 16 is the method of example(s) 11-15, wherein the compressed data structure further includes retained data, wherein the retained data includes a selected subset of data from the collected data that is less than all of the collected data, and wherein generating the response to the query includes accessing the retained data.

Example 17 is the method of example(s) 16, wherein the selected subset of data is associated with a particular quantile of the collected data.

Example 18 is the method of example(s) 16, wherein the selected subset of data is usable to recreate a distribution associated with the collected data.

Example 19 is the method of example(s) 11-18, wherein the compressed data structure further includes distribution data, wherein the distribution data includes a plurality of data points is usable to recreate a distribution associated with the collected data.

Example 20 is the method of example(s) 11-19, wherein generating the response includes accessing both of the aggregated dataset and the calculated dataset, and wherein the property is computable from the compressed data structure.

Example 21 is a computer-program product tangibly embodied in a non-transitory machine-readable storage medium, including instructions configured to cause a data processing apparatus to perform operations including: receiving a query for a property of collected data, wherein the collected data is associated with multiple observations for a plurality of records, and wherein the collected data would occupy a first amount of storage space when stored; accessing a compressed data structure associated with the set of collected data, wherein the compressed data structure includes an aggregated dataset and a calculated dataset, wherein the aggregated dataset contains aggregated observations for the plurality of records having common values for one or more selected dimension variables, wherein the calculated dataset contains pre-calculated metrics derived from the multiple observations for each of the plurality of records, and wherein the compressed data structure occupies a second amount of storage space that is less than the first amount of storage space; generating a response to the query using the compressed data structure; and transmitting the response to the query.

Example 22 is the computer-program product of example(s) 21, wherein generating the response includes accessing at least one of the aggregated dataset and the calculated dataset, and wherein the property is retrievable or computable from the compressed data structure.

Example 23 is the computer-program product of example(s) 21 or 22, wherein generating the response includes accessing the pre-calculated metrics from the calculated dataset when the property is retrievable from the pre-calculated metrics.

Example 24 is the computer-program product of example(s) 21-23, wherein generating the response includes accessing the aggregated dataset when the property is retrievable or computable from the aggregated observations.

Example 25 is the computer-program product of example(s) 21-24, wherein the number of pre-calculated metrics for each of the plurality of records in the compressed data structure is fewer than a number of observations associated with each of the plurality of records of the collected data.

Example 26 is the computer-program product of example(s) 21-25, wherein the compressed data structure further includes retained data, wherein the retained data includes a selected subset of data from the collected data that is less than all of the collected data, and wherein generating the response to the query includes accessing the retained data.

Example 27 is the computer-program product of example(s) 26, wherein the selected subset of data is associated with a particular quantile of the collected data.

Example 28 is the computer-program product of example(s) 26, wherein the selected subset of data is usable to recreate a distribution associated with the collected data.

Example 29 is the computer-program product of example(s) 21-28, wherein the compressed data structure further includes distribution data, wherein the distribution data includes a plurality of data points is usable to recreate a distribution associated with the collected data.

Example 30 is the computer-program product of example(s) 21-29, wherein generating the response includes accessing both of the aggregated dataset and the calculated dataset, and wherein the property is computable from the compressed data structure.

Example 31 is a system, comprising: one or more data processors; and a non-transitory computer-readable storage medium containing instructions which, when executed on the one or more data processors, cause the one or more data processors to perform operations including: receiving collected data, wherein the collected data is associated with multiple observations for a plurality of records, and wherein the collected data occupies a first amount of storage space; selecting one or more dimension variables associated with the collected data; generating an aggregated dataset using the collected data and the selected one or more dimension variables, wherein generating the aggregated dataset includes aggregating observations for the plurality of records having common values for the one or more dimension variables; accessing a plurality of selected metrics; generating a calculated dataset using the collected data, wherein generating the calculated dataset includes computing the plurality of selected metrics for the plurality of records; and storing a compressed data structure including the aggregated dataset and the calculated dataset, wherein the compressed data structure occupies a second amount of storage space, and wherein the second amount of storage space is less than the first amount of storage space.

Example 32 is the system of example(s) 31, wherein the operations further comprise discarding the collected data after storing the compressed data structure.

Example 33 is the system of example(s) 31 or 32, wherein the operations further comprise: receiving a query associated with the collected data; and generating a response to the query, wherein generating the response comprises accessing at least one of the aggregated dataset and the calculated dataset.

Example 34 is the system of example(s) 31-33, wherein the operations further comprise determining to compress the collected data, wherein determining to compress the collected data comprises estimating a reduction in storage space.

Example 35 is the system of example(s) 34, wherein estimating a reduction in storage space comprises: determining a number of observations associated with the plurality of records of the collected data; determining a number of metrics in the plurality of selected metrics; and comparing the number of observations with the number of metrics.

Example 36 is the system of example(s) 31-35, wherein selecting the one or more dimension variables comprises selecting the one or more dimension variables such that at least two of the plurality of records share common values for the one or more dimension variables.

Example 37 is the system of example(s) 31-36, wherein the operations further comprise: selecting a subset of data from the collected data to retain, wherein the subset of data is less than all of the collected data; storing the subset of data as retained data; and wherein storing the compressed data structure further includes storing the retained data.

Example 38 is the system of example(s) 37, wherein selecting the subset of data comprises selecting data associated with a particular quantile of the collected data.

Example 39 is the system of example(s) 37, wherein selecting the subset of data comprises selecting data usable to recreate a distribution associated with the collected data.

Example 40 is the system of example(s) 31-39, wherein the operations further comprise: computing a distribution associated with the collected data; storing a plurality of data points associated with the distribution, wherein the plurality of data points is usable to recreate the distribution without the collected data; storing the plurality of data points as retained data; and wherein storing the compressed data structure further includes storing the retained data.

Example 41 is a computer-implemented method, comprising: receiving collected data, wherein the collected data is associated with multiple observations for a plurality of records, and wherein the collected data occupies a first amount of storage space; selecting one or more dimension variables associated with the collected data generating an aggregated dataset using the collected data and the selected one or more dimension variables, wherein generating the aggregated dataset includes aggregating observations for the plurality of records having common values for the one or more dimension variables; accessing a plurality of selected metrics; generating a calculated dataset using the collected data, wherein generating the calculated dataset includes computing the plurality of selected metrics for the plurality of records; and storing a compressed data structure including the aggregated dataset and the calculated dataset, wherein the compressed data structure occupies a second amount of storage space, and wherein the second amount of storage space is less than the first amount of storage space.

Example 42 is the method of example(s) 41, further comprising discarding the collected data after storing the compressed data structure.

Example 43 is the method of example(s) 41 or 42, further comprising: receiving a query associated with the collected data; and generating a response to the query, wherein generating the response comprises accessing at least one of the aggregated dataset and the calculated dataset.

Example 44 is the method of example(s) 41-43, further comprising determining to compress the collected data, wherein determining to compress the collected data comprises estimating a reduction in storage space.

Example 45 is the method of example(s) 44, wherein estimating a reduction in storage space comprises: determining a number of observations associated with the plurality of records of the collected data; determining a number of metrics in the plurality of selected metrics; and comparing the number of observations with the number of metrics.

Example 46 is the method of example(s) 41-45, wherein selecting the one or more dimension variables comprises selecting the one or more dimension variables such that at least two of the plurality of records share common values for the one or more dimension variables.

Example 47 is the method of example(s) 41-46, further comprising: selecting a subset of data from the collected data to retain, wherein the subset of data is less than all of the collected data; storing the subset of data as retained data; and wherein storing the compressed data structure further includes storing the retained data.

Example 48 is the method of example(s) 47, wherein selecting the subset of data comprises selecting data associated with a particular quantile of the collected data.

Example 49 is the method of example(s) 47, wherein selecting the subset of data comprises selecting data usable to recreate a distribution associated with the collected data.

Example 50 is the method of example(s) 41-49, further comprising: computing a distribution associated with the collected data; storing a plurality of data points associated with the distribution, wherein the plurality of data points is usable to recreate the distribution without the collected data; storing the plurality of data points as retained data; and wherein storing the compressed data structure further includes storing the retained data.

Example 51 is a computer-program product tangibly embodied in a non-transitory machine-readable storage medium, including instructions configured to cause a data processing apparatus to perform operations including: receiving collected data, wherein the collected data is associated with multiple observations for a plurality of records, and wherein the collected data occupies a first amount of storage space; selecting one or more dimension variables associated with the collected data generating an aggregated dataset using the collected data and the selected one or more dimension variables, wherein generating the aggregated dataset includes aggregating observations for the plurality of records having common values for the one or more dimension variables; accessing a plurality of selected metrics; generating a calculated dataset using the collected data, wherein generating the calculated dataset includes computing the plurality of selected metrics for the plurality of records; and storing a compressed data structure including the aggregated dataset and the calculated dataset, wherein the compressed data structure occupies a second amount of storage space, and wherein the second amount of storage space is less than the first amount of storage space.

Example 52 is the computer-program product of example(s) 51, wherein the operations further comprise discarding the collected data after storing the compressed data structure.

Example 53 is the computer-program product of example(s) 51 or 52, wherein the operations further comprise: receiving a query associated with the collected data; and generating a response to the query, wherein generating the response comprises accessing at least one of the aggregated dataset and the calculated dataset.

Example 54 is the computer-program product of example(s) 51-53, wherein the operations further comprise determining to compress the collected data, wherein determining to compress the collected data comprises estimating a reduction in storage space.

Example 55 is the computer-program product of example(s) 54, wherein estimating a reduction in storage space comprises: determining a number of observations associated with the plurality of records of the collected data; determining a number of metrics in the plurality of selected metrics; and comparing the number of observations with the number of metrics.

Example 56 is the computer-program product of example(s) 51-55, wherein selecting the one or more dimension variables comprises selecting the one or more dimension variables such that at least two of the plurality of records share common values for the one or more dimension variables.

Example 57 is the computer-program product of example(s) 51-56, wherein the operations further comprise: selecting a subset of data from the collected data to retain, wherein the subset of data is less than all of the collected data; storing the subset of data as retained data; and wherein storing the compressed data structure further includes storing the retained data.

Example 58 is the computer-program product of example(s) 57, wherein selecting the subset of data comprises selecting data associated with a particular quantile of the collected data.

Example 59 is the computer-program product of example(s) 57, wherein selecting the subset of data comprises selecting data usable to recreate a distribution associated with the collected data.

Example 60 is the computer-program product of example(s) 51-59, wherein the operations further comprise: computing a distribution associated with the collected data; storing a plurality of data points associated with the distribution, wherein the plurality of data points is usable to recreate the distribution without the collected data; storing the plurality of data points as retained data; and wherein storing the compressed data structure further includes storing the retained data.

What is claimed is:

1. A system, comprising:
   one or more data processors; and
   a non-transitory computer-readable storage medium containing instructions which, when executed on the one or more data processors, cause the one or more data processors to perform operations including:
   receiving a query for a property of collected data, wherein the collected data is associated with multiple observations for a plurality of records, and wherein the collected data would occupy a first amount of storage space when stored;
   accessing a data structure associated with the collected data, wherein the data structure includes an aggregated dataset, a pre-computed dataset, and supplemental data;
   wherein the aggregated dataset contains aggregated observations for the plurality of records having common values for one or more selected dimension variables, wherein the aggregated dataset contains a quantity of records that is smaller than the plurality of records of the collected data;
   wherein the pre-computed dataset contains pre-computed metrics derived from the multiple observations for each of the plurality of records, wherein the number of pre-computed metrics for each of the plurality of records in the data structure is fewer than a number of observations associated with each of the plurality of records of the collected data;

wherein the supplemental data selected from the group consisting of retained data and generated distribution data;

wherein the retained data includes a selected subset of data from the collected data that is less than all of the collected data;

wherein the generated distribution data includes a plurality of data points for recreating a distribution associated with the collected data; and wherein the data structure occupies a second amount of storage space that is less than the first amount of storage space;

generating a response to the query using the data structure; and transmitting the response to the query.

2. The system of claim 1, wherein generating the response includes accessing at least one of the aggregated dataset and the pre-computed dataset, and wherein the property is retrievable or computable from the data structure.

3. The system of claim 2, wherein generating the response includes accessing the pre-computed metrics from the pre-computed dataset when the property is retrievable from the pre-computed metrics.

4. The system of claim 2, wherein generating the response includes accessing the aggregated dataset when the property is retrievable or computable from the aggregated observations.

5. The system of claim 1, wherein the supplemental data is the retained data, wherein the selected subset of data includes outlier data for at least one of the plurality of records, and wherein the outlier data is automatically selected for retention using the aggregated dataset.

6. The system of claim 1, wherein the supplemental data is the retained data, wherein the selected subset of data is associated with a particular quantile of the collected data, and wherein the selected subset of data is dynamically determined based on analysis of the collected data.

7. The system of claim 1, wherein the supplemental data is the retained data, and wherein the selected subset of data comprises a plurality of data points usable to recreate for recreating a distribution associated with the collected data.

8. The system of claim 1, wherein the supplemental data is the generated distribution data, and wherein the plurality of data points of the generated distribution data are automatically calculated based on the collected data to recreate the distribution associated with the collected data.

9. The system of claim 1, wherein generating the response includes accessing both of the aggregated dataset and the pre-computed dataset, and wherein the property is computable from the data structure.

10. A computer-implemented method, comprising:
receiving a query for a property of collected data, wherein the collected data is associated with multiple observations for a plurality of records, and wherein the collected data would occupy a first amount of storage space when stored;
accessing a data structure associated with the collected data, wherein the data structure includes an aggregated dataset, a pre-computed dataset, and supplemental data;
wherein the aggregated dataset contains aggregated observations for the plurality of records having common values for one or more selected dimension variables, wherein the aggregated dataset contains a quantity of records that is smaller than the plurality of records of the collected data;

wherein the pre-computed dataset contains pre-computed metrics derived from the multiple observations for each of the plurality of records;

wherein the supplemental data selected from the group consisting of retained data and generated distribution data, wherein the number of pre-computed metrics for each of the plurality of records in the data structure is fewer than a number of observations associated with each of the plurality of records of the collected data;

wherein the retained data includes a selected subset of data from the collected data that is less than all of the collected data;

wherein the generated distribution data includes a plurality of data points for recreating a distribution associated with the collected data; and wherein the data structure occupies a second amount of storage space that is less than the first amount of storage space;

generating a response to the query using the data structure; and transmitting the response to the query.

11. The method of claim 10, wherein generating the response includes accessing at least one of the aggregated dataset and the pre-computed dataset, and wherein the property is retrievable or computable from the data structure.

12. The method of claim 11, wherein generating the response includes accessing the pre-computed metrics from the pre-computed dataset when the property is retrievable from the pre-computed metrics.

13. The method of claim 11, wherein generating the response includes accessing the aggregated dataset when the property is retrievable or computable from the aggregated observations.

14. The method of claim 10, wherein the supplemental data is the retained data, wherein the selected subset of data includes outlier data for at least one of the plurality of records, and wherein the outlier data is automatically selected for retention using the aggregated dataset.

15. The method of claim 10, wherein the supplemental data is the retained data, wherein the selected subset of data is associated with a particular quantile of the collected data, and wherein the selected subset of data is dynamically determined based on analysis of the collected data.

16. The method of claim 10, wherein the supplemental data is the retained data, and wherein the selected subset of data comprises a plurality of data points for recreating a distribution associated with the collected data.

17. The method of claim 10, wherein the supplemental data is the generated distribution data, and wherein the plurality of data points of the generated distribution data are automatically calculated based on the collected data to recreate the distribution associated with the collected data.

18. The method of claim 10, wherein generating the response includes accessing both of the aggregated dataset and the pre-computed dataset, and wherein the property is computable from the data structure.

19. A computer-program product tangibly embodied in a non-transitory machine-readable storage medium, including instructions configured to cause a data processing apparatus to perform operations including:
receiving a query for a property of collected data, wherein the collected data is associated with multiple observations for a plurality of records, and wherein the collected data would occupy a first amount of storage space when stored;

accessing a data structure associated with the collected data, wherein the data structure includes an aggregated dataset, a pre-computed dataset, and supplemental data;

wherein the aggregated dataset contains aggregated observations for the plurality of records having common values for one or more selected dimension variables, wherein the aggregated dataset contains a quantity of records that is smaller than the plurality of records of the collected data;

wherein the pre-computed dataset contains pre-computed metrics derived from the multiple observations for each of the plurality of records, wherein the number of pre-computed metrics for each of the plurality of records in the data structure is fewer than a number of observations associated with each of the plurality of records of the collected data;

wherein the supplemental data selected from the group consisting of retained data and generated distribution data;

wherein the retained data includes a selected subset of data from the collected data that is less than all of the collected data;

wherein the generated distribution data includes a plurality of data points for recreating a distribution associated with the collected data; and wherein the data structure occupies a second amount of storage space that is less than the first amount of storage space;

generating a response to the query using the data structure; and transmitting the response to the query.

20. The computer-program product of claim 19, wherein generating the response includes accessing at least one of the aggregated dataset and the pre-computed dataset, and wherein the property is retrievable or computable from the data structure.

21. The computer-program product of claim 20, wherein generating the response includes accessing the pre-computed metrics from the pre-computed dataset when the property is retrievable from the pre-computed metrics.

22. The computer-program product of claim 20, wherein generating the response includes accessing the aggregated dataset when the property is retrievable or computable from the aggregated observations.

23. The computer-program product of claim 19, wherein the supplemental data is the retained data, wherein the selected subset of data includes outlier data for at least one of the plurality of records, and wherein the outlier data is automatically selected for retention using the aggregated dataset.

24. The computer-program product of claim 19, wherein the supplemental data is the retained data, wherein the selected subset of data is associated with a particular quantile of the collected data, and wherein the selected subset of data is dynamically determined based on analysis of the collected data.

25. The computer-program product of claim 19, wherein the supplemental data is the retained data, wherein the selected subset of data comprises a plurality of data points for recreating a distribution associated with the collected data.

26. The computer-program product of claim 19, wherein the supplemental data is the generated distribution data, and wherein the plurality of data points of the generated distribution data are automatically calculated based on the collected data to recreate the distribution associated with the collected data.

27. The computer-program product of claim 19, wherein generating the response includes accessing both of the aggregated dataset and the pre-computed dataset, and wherein the property is computable from the data structure.

* * * * *

UNITED STATES PATENT AND TRADEMARK OFFICE
CERTIFICATE OF CORRECTION

PATENT NO. : 10,198,532 B2
APPLICATION NO. : 15/922317
DATED : February 5, 2019
INVENTOR(S) : Stacey Michelle Christian, Katherine Fullington Taylor and Donald James Erdman It is certified that error appears in the above-identified patent and that said Letters Patent is hereby corrected as shown below:

In the Claims

Column 51, Lines 45-46, Claim 7: replace 'usable to recreate for recreating' with -- for recreating --

Signed and Sealed this
Second Day of July, 2019

Andrei Iancu
*Director of the United States Patent and Trademark Office*